(12) United States Patent
Fan et al.

(10) Patent No.: US 12,010,592 B2
(45) Date of Patent: Jun. 11, 2024

(54) SIDELINK COMMUNICATIONS METHOD AND APPARATUS

(71) Applicant: Huawei Technologies Co., Ltd., Shenzhen (CN)

(72) Inventors: Qiang Fan, Hefei (CN); Jun Wang, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 427 days.

(21) Appl. No.: 17/213,911

(22) Filed: Mar. 26, 2021

(65) Prior Publication Data

US 2021/0219105 A1 Jul. 15, 2021

Related U.S. Application Data

(63) Continuation of application No. PCT/CN2019/107337, filed on Sep. 23, 2019.

(30) Foreign Application Priority Data

Sep. 28, 2018 (CN) .......................... 201811143553.7

(51) Int. Cl.
*H04W 4/40* (2018.01)
*H04W 4/06* (2009.01)
(Continued)

(52) U.S. Cl.
CPC ............... *H04W 4/06* (2013.01); *H04W 4/40* (2018.02); *H04W 12/10* (2013.01); *H04W 76/11* (2018.02); *H04W 80/02* (2013.01); *H04W 92/18* (2013.01)

(58) Field of Classification Search
None
See application file for complete search history.

(56) References Cited

U.S. PATENT DOCUMENTS

2015/0359023 A1* 12/2015 Stojanovski ...... H04W 36/0088
370/329
2016/0080531 A1 3/2016 Agiwal
(Continued)

FOREIGN PATENT DOCUMENTS

| CN | 106470384 A | 3/2017 |
|----|-------------|--------|
| CN | 107079338 A | 8/2017 |

(Continued)

OTHER PUBLICATIONS

3GPP TR 23.786 V0.7.0 (Jul. 2018), 3rd Generation Partnership Project; Technical Specification Group Services and System Aspects; Study on architecture enhancements for EPS and 5G System to support advanced V2X services (Release 16), 58 pages.
(Continued)

*Primary Examiner* — Anh Ngoc M Nguyen
(74) *Attorney, Agent, or Firm* — Slater Matsil, LLP

(57) ABSTRACT

A communications method that meets QoS requirements of services of different communication types, including: an application layer entity of a first terminal device delivers communication type information and a target side identifier to a control layer entity of the first terminal device; the control layer entity of the first terminal device establishes, based on the communication type information, a radio bearer group that is of a sidelink and that corresponds to a communication type, where the radio bearer group of the sidelink corresponds to the target side identifier.

18 Claims, 13 Drawing Sheets

(51) Int. Cl.
  *H04W 12/10* (2021.01)
  *H04W 76/11* (2018.01)
  *H04W 80/02* (2009.01)
  *H04W 92/18* (2009.01)

(56) References Cited

U.S. PATENT DOCUMENTS

| | | | |
|---|---|---|---|
| 2017/0318532 A1 | 11/2017 | Yi | |
| 2018/0054693 A1 | 2/2018 | Agiwal et al. | |
| 2020/0037190 A1* | 1/2020 | Wu | H04W 28/0278 |
| 2021/0385694 A1* | 12/2021 | Freda | H04W 28/0268 |

FOREIGN PATENT DOCUMENTS

| | | |
|---|---|---|
| CN | 107347215 A | 11/2017 |
| CN | 107645710 A | 1/2018 |
| WO | 2015163670 A1 | 10/2015 |
| WO | 2017051494 A1 | 3/2017 |
| WO | 2018141355 A1 | 8/2018 |

OTHER PUBLICATIONS

Qualcomm Incorporated et al., "Unicast and multicast V2X communication support over PC5", SA WG2 Meeting #S2-127BIS, S2-185841, May 28-Jun. 1, 2018, 8 pages, Newport Beach, California, USA.

Huawei et al., "Support of QoS for PC5-based V2V transport", 3GPP TSG-RAN WG2 Meeting #94 R2-163811, May 23-27, 2016, 6 pages, Nanjing, China.

3GPP TS 38.331 V15.3.0, 3rd Generation Partnership Project, Technical Specification Group Radio Access Network, NR, Radio Resource Control (RRC) protocol specification (Release 15), Sep. 2018, 445 pages.

LG Electronics Inc., "Support of multiple PC5-S connections over a PC5-RRC connection", 3GPP TSG-RAN WG2 #105, R2-1905049, Apr. 8-12, 2019, 3 pages, Xian, China.

ETSI MCC, "Report of 3GPP TSG RAN meeting #78 Lisbon, Portugal, Dec. 18-21, 2017", 3GPP TSG RAN meeting #79, RP-180516, Mar. 19-22, 2018, 192 pages, Chennai, India.

* cited by examiner

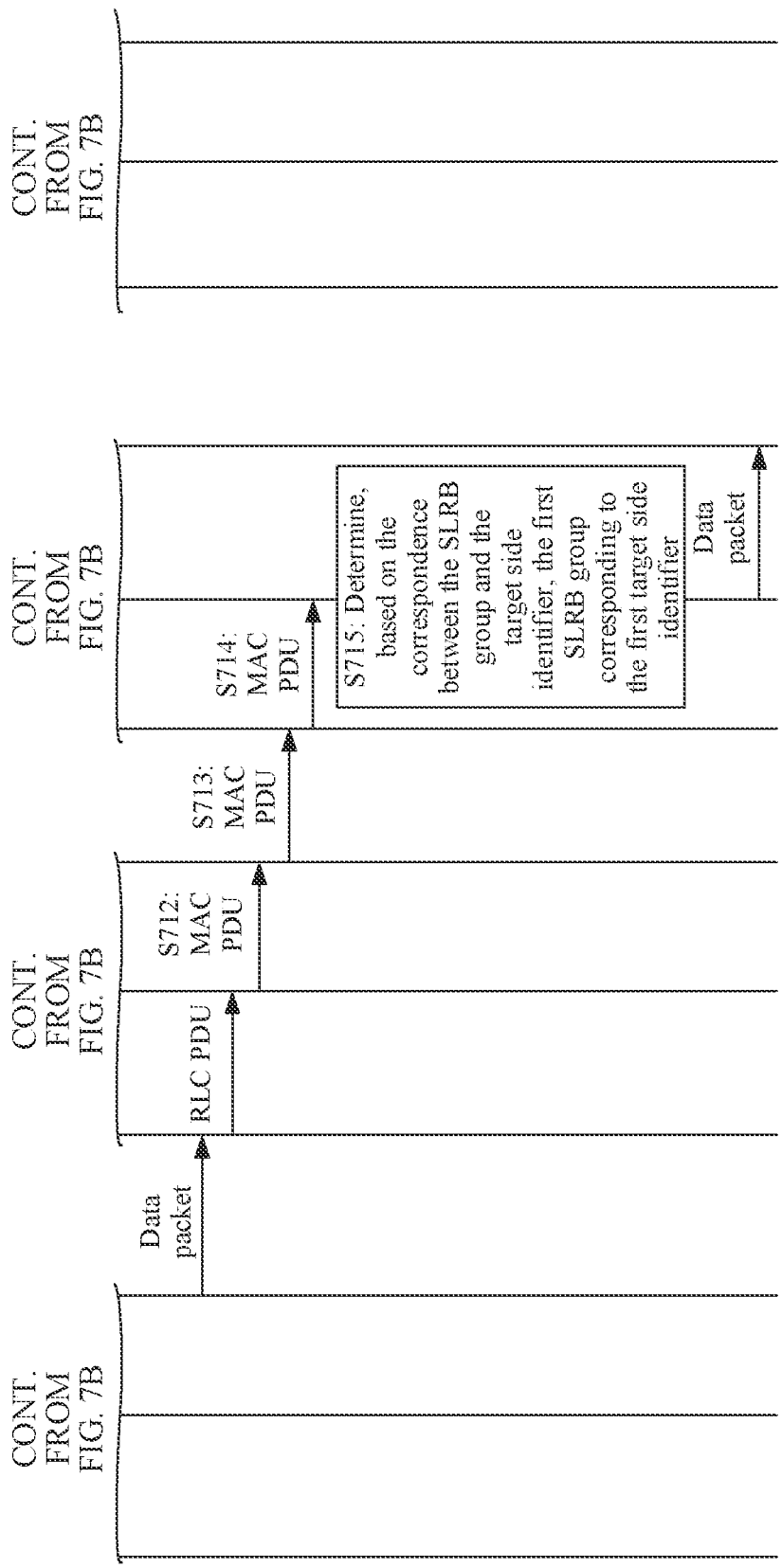

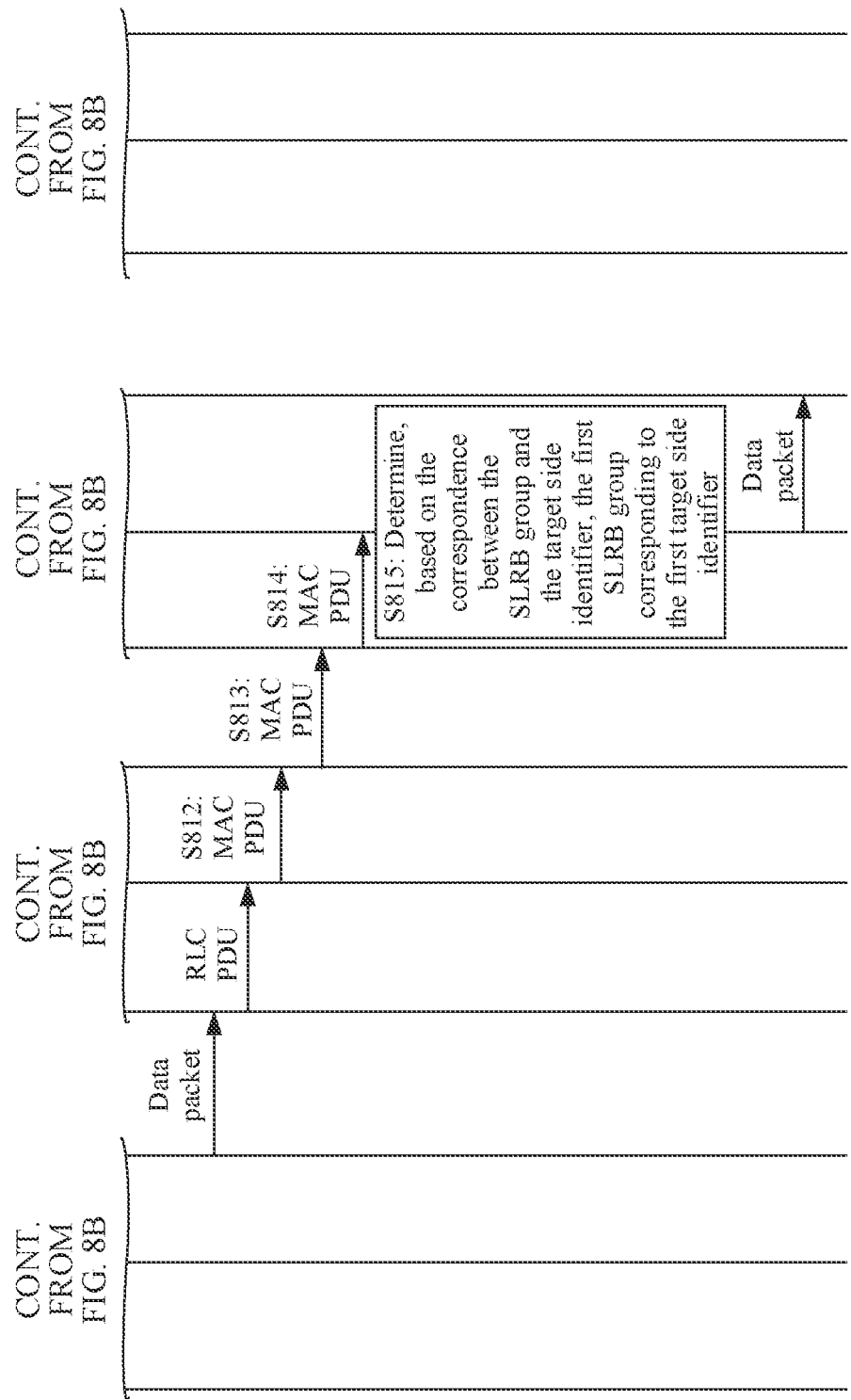

SIDELINK COMMUNICATIONS METHOD AND APPARATUS

CROSS-REFERENCE TO RELATED APPLICATIONS

This application is a continuation of International Application No. PCT/CN2019/107337, filed on Sep. 23, 2019, which claims priority to Chinese Patent Application No. 201811143553.7, filed on Sep. 28, 2018. The disclosures of the aforementioned applications are herein incorporated by reference in their entireties.

TECHNICAL FIELD

Embodiments of this application relate to the field of communications technologies, and in particular, to a communications method and apparatus.

BACKGROUND

In a vehicle to everything (V2X) communications system, a transmit end device and a receive end device maintain a group of sidelink radio bearers (SLRBs) for each type of V2X service. Each group of SLRBs include one or more SLRBs, each SLRB corresponds to a packet data convergence protocol (PDCP) layer entity, a radio link control (RLC) layer entity, and a sidelink logical channel (SL LCH), and the SLRBs have a same configuration (including a PDCP entity configuration, an RLC entity configuration, an LCH configuration, and the like).

When an application layer entity of the transmit end device generates a data packet corresponding to a type of V2X service and delivers the data packet to a lower layer entity, where the data packet may carry information such as a priority parameter and a V2X service identifier (for example, a destination layer-2 identifier (destination layer-2 id)) that is used to identify the type of V2X service. The lower layer entity of the transmit end device may deliver, based on a mapping relationship between an SLRB and information such as a V2X service identifier and a priority parameter, the data packet to an SLRB that is in the sending device and that corresponds to the information such as the V2X service identifier and the priority parameter. The SLRB in the sending device processes the received data packet, and delivers the processed data to a media access control (MAC) layer entity of the sending device. The MAC layer entity of the sending device processes the data packet that has been processed by the SLRB, and generates a MAC protocol data unit (PDU) including a source layer-2 identifier (source layer-2 ID), a destination layer-2 id, and a logical channel identifier (LCID) of an SL LCH, and delivers the MAC PDU to a physical layer entity (PHY layer entity) of the sending device. The PHY layer entity of the sending device sends the MAC PDU to the receive end device through a direct connection channel (for example, a PC5 interface) between the transmit end device and the receive end device. After receiving the MAC PDU, a PHY layer entity of the receive end device delivers, based on the source layer-2 id, the destination layer-2 id, and the LCID that are carried in the MAC PDU, a MAC service data unit (SDU) included in the MAC PDU to an SLRB that is in the receive end device and that corresponds to the type of V2X service for processing.

Because configurations of SLRBs maintained by the transmit end device and the receive end device are the same, all types of V2X services are processed by using a same SLRB configuration during transmission. However, quality of service (QoS) requirements of different V2X services may be different. For example, some V2X services require a low latency, high reliability, and the like, and some V2X services do not have a high latency requirement. In this case, if all V2X services are processed by using SLRBs with a same configuration, quality of service of different V2X services cannot be controlled and assured, that is, QoS requirements of different V2X services cannot be met.

SUMMARY

Embodiments of this application provide a communications method and apparatus, to meet QoS requirements of services of different communication types.

To achieve the foregoing objective, the embodiments of this application provide the following technical solutions.

According to a first aspect, an embodiment of this application provides a communication method. The method includes: delivering, by an application layer entity of a first terminal device, communication type information and a target side identifier to a control layer entity of the first terminal device; and establishing, by the control layer entity of the first terminal device based on the communication type information, a radio bearer group that is of a sidelink and that corresponds to a communication type, where the communication type information includes or is used to indicate the communication type to be performed by the first terminal device, the communication type is unicast communication or multicast communication, and the target side identifier is used to identify the unicast communication or the multicast communication; and the radio bearer group of the sidelink corresponds to the target side identifier, and the sidelink is a wireless communications link between the first terminal device and a second terminal device.

Optionally, configuration information of different radio bearer groups in radio bearer groups of a sidelink may be different. For example, configuration information of a radio bearer group corresponding to multicast communication may be different from a configuration information of a radio bearer group corresponding to unicast communication.

Based on the method provided in the first aspect, different radio bearer groups may be established for different communication types. Subsequently, when data of a specific communication type is sent downward, the data may be processed by using a radio bearer group corresponding to the communication type, so that data of different communication types is processed by using different radio bearer groups, and quality of service requirements of the data of different communication types are controlled and ensured.

In a possible design, configuration information of the radio bearer group of the sidelink is prestored in the first terminal device; or the method further includes: receiving, by the first terminal device, configuration information that is of the radio bearer group of the sidelink and that is sent by the radio access network device. Based on the method, the terminal device may obtain, from the prestored configuration information of the radio bearer group of the sidelink, configuration information of the radio bearer group established by the terminal device, or dynamically obtain configuration information of the radio bearer group from the radio access network device. The obtaining manner is flexible and simple.

In a possible design, the control layer entity of the first terminal device sends a first message to a control layer entity of the second terminal device, and receives a first response sent by the second terminal device. The first terminal device and the second terminal device are performing or are about to perform the unicast communication or the multicast communication, and the first message includes the configuration information of the radio bearer group of the sidelink. Based on the method, the terminal device may send, to another member that is performing or is about to perform the unicast communication or the multicast communication with the terminal device, the configuration information of the radio bearer group that is of the sidelink and that is established by the terminal device. In this way, when establishing a radio bearer group that is of the sidelink and that corresponds to a communication type, another member does not need to obtain configuration information of the radio bearer group in another manner, thereby reducing signaling overheads caused when the another member obtains the configuration information of the radio bearer group.

In a possible design, the method further includes: in duration greater than or equal to specified duration, if the control layer entity of the first terminal device does not receive the first response, resending, by the control layer entity of the first terminal device, the first message to the control layer entity of the second terminal device. Based on the method, it can be ensured that the terminal device sends the configuration information of the radio bearer group to another member in the unicast communication or the multicast communication.

In a possible design, the method further includes: determining, by the control layer entity of the first terminal device, a security mode configuration, and sending the first message and the security mode configuration to a PDCP layer entity of the first terminal device, where after performing confidentiality protection and integrity protection on the first message based on the security mode configuration, the PDCP layer entity of the first terminal device sends the first message to the control layer entity of the second terminal device; and the security mode configuration includes a related configuration by using which the first terminal device performs the confidentiality protection and the integrity protection on the first message. Based on the method, security of the configuration information that is of the radio bearer group and that is sent by the terminal device to another member in the unicast communication or the multicast communication can be ensured.

In a possible design, the method further includes: delivering, by the application layer entity of the first terminal device, a data packet and a first target side identifier to an SDAP layer entity of the first terminal device; determining, by the SDAP layer entity of the first terminal device based on a correspondence between the radio bearer group of the sidelink and the target side identifier, a first radio bearer group that is of the sidelink and that corresponds to the first target side identifier; and delivering the data packet to a PDCP layer entity corresponding to the first radio bearer group of the sidelink; processing, by the PDCP layer entity, the data packet to obtain a PDCP protocol data unit PDU, and delivering the PDCP PDU to a radio link control RLC layer entity corresponding to the first radio bearer group of the sidelink; processing, by the RLC layer entity, the PDCP PDU to obtain an RLC PDU, and delivering the RLC PDU to a media access control MAC layer entity of the first terminal device; and processing, by the MAC layer entity of the first terminal device, the RLC PDU to obtain a MAC PDU, and delivering the MAC PDU to a physical PHY layer entity of the first terminal device.

For example, the data packet delivered by the application layer entity of the first terminal device to the SDAP layer entity of the first terminal device may be a data packet in the unicast communication or a data packet in the multicast communication, and the first target side identifier may be used to identify a communication type corresponding to the data packet. The first target side identifier may be included in a data packet and delivered to the SDAP layer entity of the first terminal device, or may be included in a message other than a data packet and delivered to the SDAP layer entity of the first terminal device. This is not limited.

Based on the method, it can be ensured that a data packet transmitted in unicast communication (or multicast communication) is delivered to a radio bearer group corresponding to the unicast communication (or the multicast communication) for processing. That is, different radio bearer groups are used to process data packets of different communication types, so as to ensure QoS requirements of the data packets of different communication types.

In a possible design, the method further includes: delivering, by the application layer entity of the first terminal device, a first quality of service QoS parameter to the SDAP layer entity of the first terminal device; and determining, by the SDAP layer entity of the first terminal device based on a correspondence between a QoS parameter and a radio bearer of a sidelink, a first radio bearer that is in the first radio bearer group of the sidelink and that corresponds to the first QoS parameter, and delivering the data packet to a PDCP layer entity corresponding to the first radio bearer. Based on the method, based on a correspondence between a radio bearer in a radio bearer group and a QoS parameter, radio bearers for processing data packets may be distinguished at a granularity of a QoS requirement. When a data packet is processed by the radio bearer group, a radio bearer that is in the radio bearer group and that corresponds to a QoS parameter of the data packet is used for processing, thereby meeting a QoS requirement of data packets.

In a possible design, the method further includes: delivering, by the MAC layer entity of the first terminal device, any one or more pieces of information of the first target side identifier, the first QoS parameter, and the communication type information to the PHY layer entity of the first terminal device. Based on the method, a peer device may determine, based on the target side identifier, the QoS parameter, and the communication type information, whether a received data packet is a data packet of the peer device, determine a communication type to which the received data packet belongs, configure a radio bearer group corresponding to a QoS parameter of the received data packet, and the like.

In a possible design, the method further includes: broadcasting, by the application layer entity of the first terminal device, an establishment request used to request to establish the unicast communication or the multicast unicast communication, and receiving an establishment response used to instruct to establish the unicast communication or the multicast communication with the first terminal device. Based on the method, the unicast communication or the multicast communication may be established based on the application layer entity.

In a possible design, the method further includes: receiving, by the control layer entity of the first terminal device, a request message used to request to establish the unicast communication or the multicast communication with the first terminal device; and sending a response message used to instruct the first terminal device to determine to establish the unicast communication or the multicast communication. Based on the method, the unicast communication or the multicast communication may be established by using the control layer entity.

In a possible design, the method further includes: broadcasting, by the application layer entity of the first terminal device or the control layer entity of the first terminal device, a discovery message used to discover the first terminal device. For example, the discovery message is an RRC message. Based on the method, another device in a network may learn of existence of the terminal device, so that the another device in the network sends the discovery message to the terminal device.

According to a second aspect, this application provides a communications apparatus. The communications apparatus may be a first terminal device, or a chip or a system-on-a-chip in a first terminal device. The communications apparatus may implement functions performed by the first terminal device in the foregoing aspects or the possible designs. The functions may be implemented by hardware, or may be implemented by hardware by executing corresponding software. The hardware or the software includes one or more modules corresponding to the functions. For example, the communications apparatus may include a processing module and a sending module. For example, the processing module has functions of an application layer entity, a control layer entity, an SDAP layer entity, a PDCP layer entity, an RLC layer entity, and a MAC layer entity in the first terminal device. The sending module has a function of a PHY layer entity in the first terminal device. For example, the sending module may send data or information to a device other than the communications apparatus.

The processing module is configured to generate a target side identifier used to identify unicast communication or multicast communication, and establish a radio bearer group that is of a sidelink and that corresponds to a communication type, where the radio bearer group of the sidelink corresponds to the target side identifier, and the sidelink is a wireless communications link between a first terminal device and a second terminal device; and the communication type is the unicast communication or the multicast communication.

For example, for a specific implementation of the communications apparatus, refer to behavior functions of the first terminal device in the communication method provided in the first aspect or any possible design of the first aspect. Details are not described herein again. Therefore, the provided communications apparatus can achieve a same beneficial effect as the first aspect or any possible design of the first aspect.

According to a third aspect, a communications apparatus is provided. The communications apparatus includes: a processor and a memory. The memory is configured to store a computer-executable instruction. When the communications apparatus runs, the processor executes the computer-executable instruction stored in the memory, so that the communications apparatus performs the communication method according to the first aspect or any possible design of the first aspect.

According to a fourth aspect, a computer-readable storage medium is provided. The computer-readable storage medium stores an instruction, and when the instruction is run on a computer, the computer is enabled to perform the communication method according to the first aspect or any possible design of the first aspect.

According to a fifth aspect, a computer program product including an instruction is provided. When the computer program product runs on a computer, the computer is enabled to perform the communication method according to the first aspect or any possible design of the foregoing aspects.

According to a sixth aspect, a chip system is provided. The chip system includes a processor and a communications interface, and is configured to support a communications apparatus in implementing the functions in the foregoing aspects. For example, the processor generates a target side identifier used to identify unicast communication or multicast communication, and establishes a radio bearer group that is of a sidelink and that corresponds to a communication type. In a possible design, the chip system further includes a memory, and the memory is configured to store a program instruction and data that are necessary for the communications apparatus. The chip system may include a chip, or may include a chip and another discrete device.

For example, for a technical effect achieved by any design manner of the third aspect to the sixth aspect, refer to the technical effects achieved by the first aspect or any possible design of the first aspect. Details are not described again.

According to a seventh aspect, a communication method is provided. The method further includes: delivering, by an application layer entity of a first terminal device, a data packet and a first target side identifier to an SDAP layer entity of the first terminal device; determining, by the SDAP layer entity of the first terminal device based on a correspondence between a radio bearer group of a sidelink and a target side identifier, a first radio bearer group that is of the sidelink and that corresponds to the first target side identifier, and delivering the data packet to a PDCP layer entity corresponding to the first radio bearer group of the sidelink; processing, by the PDCP layer entity, the data packet to obtain a PDCP protocol data unit PDU, and delivering the PDCP PDU to a radio link control RLC layer entity corresponding to the first radio bearer group of the sidelink; processing, by the RLC layer entity, the PDCP PDU to obtain an RLC PDU, and delivering the RLC PDU to a media access control MAC layer entity of the first terminal device; and processing, by the MAC layer entity of the first terminal device, the RLC PDU to obtain a MAC PDU, and delivering the MAC PDU to a physical PHY layer entity of the first terminal device. Based on the method, it can be ensured that a data packet transmitted in unicast communication (or multicast communication) is delivered to a radio bearer group corresponding to the unicast communication (or the multicast communication) for processing. That is, different radio bearer groups are used to process data packets of different communication types, so as to ensure QoS requirements of the data packets of different communication types.

In a possible design, the method further includes: delivering, by the application layer entity of the first terminal device, a first quality of service QoS parameter to the SDAP layer entity of the first terminal device, and determining, based on a correspondence between a QoS parameter and a radio bearer of a sidelink, a first radio bearer that is in the first radio bearer group of the sidelink and that corresponds to the first QoS parameter, and delivering the data packet to a PDCP layer entity included in the first radio bearer. Based on the method, based on a correspondence between a radio bearer in a radio bearer group and a QoS parameter, radio bearers for processing data packets may be distinguished at a granularity of a QoS requirement. When a data packet is processed by the radio bearer group, a radio bearer that is in the radio bearer group and that corresponds to a QoS parameter of the data packet is used for processing, thereby meeting a QoS requirement of data packets.

In a possible design, the method further includes: delivering, by the MAC layer entity of the first terminal device, any one or more pieces of information of the first target side identifier, the first QoS parameter, and communication type information to the PHY layer entity of the first terminal device. Based on the method, a peer device may determine, based on the target side identifier, the QoS parameter, and the communication type information, whether a received data packet is a data packet of the peer device, determine a communication type to which the received data packet belongs, configure a radio bearer corresponding to a QoS parameter of the received data packet, and the like.

According to an eighth aspect, this application provides a communications apparatus. The communications apparatus may be a first terminal device, or a chip or a system-on-a-chip in a first terminal device. The communications apparatus may implement functions performed by the first terminal device in the seventh aspect or the possible designs of the seventh aspect. The functions may be implemented by hardware, or by executing corresponding software by hardware. The hardware or the software includes one or more modules corresponding to the functions. For example, the communications apparatus may include a processing module and a sending module. For example, functions of an application layer entity, a control layer entity, an SDAP layer entity, a PDCP layer entity, an RLC layer entity, and a MAC layer entity in the first terminal device are integrated into the processing module. For example, the processing module may include the application layer entity, the control layer entity, the SDAP layer entity, the PDCP layer entity the RLC layer entity, and the MAC layer entity. The sending module has a function of a PHY layer entity in the first terminal device.

The processing module is configured to: determine, based on a correspondence between a radio bearer group of a sidelink and a target side identifier, a first radio bearer group that is of the sidelink and that corresponds to a first target side identifier, and deliver the data packet to a packet data convergence protocol PDCP layer entity corresponding to the first radio bearer group of the sidelink. The PDCP layer entity processes the data packet to obtain a PDCP PDU, and delivers the PDCP PDU to an RLC layer entity corresponding to the first radio bearer group of the sidelink. The RLC layer entity processes the PDCP PDU to obtain an RLC PDU, and delivers the RLC PDU to a MAC layer entity of the first terminal device. The MAC layer entity of the first terminal device processes the RLC PDU to obtain a MAC PDU, and delivers the MAC PDU to the PHY layer entity of the first terminal device.

For example, for a specific implementation of the communications apparatus, refer to behavior functions of the first terminal device in the communication method provided in the seventh aspect or any possible design of the seventh aspect. Details are not described herein again. Therefore, the provided communications apparatus can achieve a same beneficial effect as the seventh aspect or any possible design of the seventh aspect.

According to a ninth aspect, a communications apparatus is provided. The communications apparatus includes a processor and a memory. The memory is configured to store a computer-executable instruction. When the communications apparatus runs, the processor executes the computer-executable instruction stored in the memory, so that the communications apparatus performs the communication method according to the seventh aspect or any possible design of the seventh aspect.

According to a tenth aspect, a computer-readable storage medium is provided. The computer-readable storage medium stores an instruction, and when the instruction is run on a computer, the computer is enabled to perform the communication method according to the seventh aspect or any possible design of the foregoing aspects.

According to an eleventh aspect, a computer program product including an instruction is provided. When the computer program product runs on a computer, the computer is enabled to perform the communication method according to the seventh aspect or any possible design of the foregoing aspects.

According to a twelfth aspect, a chip system is provided. The chip system includes a processor and a communications interface, and is configured to support a communications apparatus in implementing the functions in the foregoing aspects. For example, the processor determines, based on a correspondence between a radio bearer group of a sidelink and a target side identifier, a first radio bearer group that is of the sidelink and that corresponds to a first target side identifier, and delivers a data packet to the first radio bearer group of the sidelink. In a possible design, the chip system further includes a memory, and the memory is configured to store a program instruction and data that are necessary for the communications apparatus. The chip system may include a chip, or may include a chip and another discrete device.

For a technical effect achieved by any design manner of the ninth aspect to the twelfth aspect, refer to the technical effects achieved by any one of the seventh aspect or the possible designs of the seventh aspect. Details are not described herein again.

BRIEF DESCRIPTION OF THE DRAWINGS

FIG. 7A, FIG. 7B, and FIG. 7C are a flowchart of another communication method according to an embodiment of this application;

FIG. 8A, FIG. 8B, and FIG. 8C are a schematic composition diagram of another communication method according to an embodiment of this application;

DETAILED DESCRIPTION OF ILLUSTRATIVE EMBODIMENTS

Figure 1:
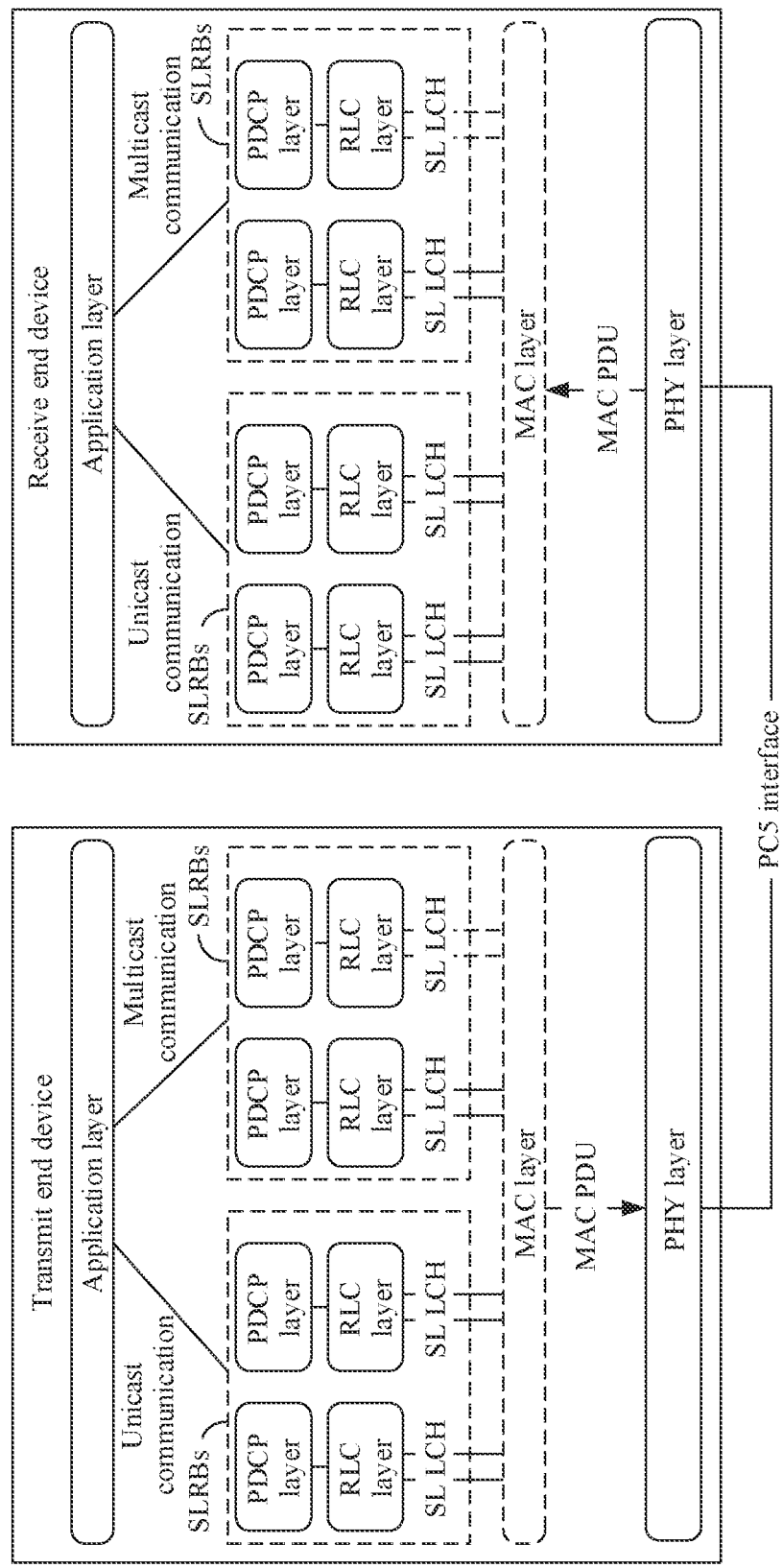
FIG. 1 is a principle block diagram according to an embodiment of this application.

A principle block diagram of embodiments of this application is shown in FIG. 1, and may be: A transmit end device and a receive end device maintain different radio bearer groups of a sidelink for different communication types (unicast communication or multicast communication). The sidelink may be a wireless communications link between the transmit end device and the receive end device, and each radio bearer group has a different configuration. Subsequently, when the transmit end device transmits a data packet corresponding to the unicast communication to the receive end device, the transmit end device processes the data packet by using a radio bearer group corresponding to the unicast communication, and then sends the data packet to the receive end device. After receiving the data packet, the receive end device also processes the data packet by using a radio bearer group corresponding to the unicast communication. Similarly, when the sending device transmits a data packet corresponding to the multicast communication to the receive end device, the transmit end device processes the data packet by using a radio bearer group corresponding to the multicast communication, and then sends the data packet to the receive end device. After receiving the data packet, the receive end device also processes the data packet by using a radio bearer group corresponding to the multicast communication. In this way, data packets of different communication types are processed by using radio bearer groups with different configurations, so that quality of service of the data packets transmitted in different communication types can be controlled and ensured.

Optionally, in the embodiments of this application, a sending device and a receiving device are relative concepts. The sending device may be a device that sends a data packet, and the receiving device may be a device that receives a data packet.

Optionally, in the embodiments of this application, in addition to the unicast communication or the multicast communication, the communication type may be communication of another type, for example, broadcast communication. The embodiments of this application is described by using only the unicast communication and the multicast communication as an example. For communication of another type, an appropriate radio bearer group may be configured for the communication of this type by referring to methods provided in the embodiments of this application.

Optionally, a radio bearer group of a sidelink may be referred to as an SLRB group, SLRBs, a radio bearer group, or an RB group. The following describes communication methods provided in the embodiments of this application by using an example in which the radio bearer group of the sidelink is an SLRB group or SLRBs.

First, to facilitate understanding of the embodiments of this application, some terms in the embodiments of this application are described.

SLRBs: The SLRBs may include one or more independent radio bearers, and the radio bearer may be referred to as an SLRB. Each SLRB corresponds to one PDCP layer entity, one or more RLC layer entities, one or more LCHs, and the like. Alternatively, it may be described as that each SLRB includes one PDCP layer entity, one or more RLC layer entities, one or more LCHs, and the like. In the embodiments of this application, each SLRB uses an independent configuration, and the configuration of each SLRB varies with a communication type corresponding to the SLRB. Configuration information of SLRBs may include a configuration of each SLRB in the SLRBs, and the configuration of the SLRB may include: an SLRB identifier, a PDCP entity configuration, an RLC entity configuration, an LCH configuration, and the like. For example, an SLRB identifier may be used to identify an SLRB, and may be an index number of the SLRB. Configurations of different SLRBs included in same SLRBs group may be the same or different. For example, an SLRB group includes eight SLRBs, and IDs of LCHs corresponding to the eight SLRBs may be different from each other.

PDCP entity configuration: The PDCP entity configuration is a configuration for a PDCP layer entity, and may include but is not limited to any one or more of the following configuration parameters: timing duration of a timer (discardTimer) that is used to control a time during which a PDCP SDU can be stored in a PDCP buffer, a sequence number (SN) length used by a PDCP layer PDU, a security configuration (which includes whether ciphering and/or integrity protection is used) used by the PDCP layer entity, a security algorithm (an integrity protection algorithm and an encryption algorithm), a key, and/or the like used by the PDCP layer entity, information about whether the PDCP layer entity uses a duplication mechanism, a related configuration of a header compression algorithm of the PDCP layer entity, and the like.

RLC entity configuration: The RLC entity configuration is a configuration for an RLC layer entity, and may include but is not limited to any one or more of the following configuration parameters: a mode used by the RLC layer entity: a transparent mode (TM)/an unacknowledged mode (UM)/an acknowledged mode (AM). If the RLC layer entity is configured to use the AM mode, the RLC entity configuration further includes at least one or more of the following: an SN length of an RLC layer PDU, timing duration (t-PollRetransmit) of a timer that controls initiation of poll retransmission, a parameter (poll PDU) that controls initiation of a poll after a specific quantity of RLC PDUs are sent, a parameter (poll Byte) that controls initiation of a poll after RLC PDUs of a specific quantity of bytes are sent, and a maximum quantity (maxRetxThreshold) of retransmission times at an RLC layer. For example, a poll may mean that an RLC layer entity in the sending device instructs, by using a poll bit in a MAC PDU, an RLC layer entity that uses the AM mode in the receiving device to feed back a status report. If the RLC layer entity is configured to use the UM mode, the RLC entity configuration further includes at least one of the following: the SN length of the RLC layer PDU.

LCH configuration: The LCH configuration is a configuration for an LCH, and may include but is not limited to any one or more of the following configuration parameters: an LCH identifier, an identifier of a logical channel group to which an LCH belongs, related parameters (a priority, a prioritized bit rate (prioritizedBitRate, PBR), token bucket size duration (BSD), and the like) for logical channel priority processing, information about a carrier that may be used to transmit data in the LCH, numerology information (for example, one or more of parameters such as a subcarrier spacing, a cyclic prefix length, resource time domain duration, and whether a resource is a configured grant resource) of a resource used to transmit data in the LCH, a parameter scheduling request (SR) (SR-mask) that controls whether the LCH can trigger a scheduling request, a parameter (SR-DelayTimerApplied) that controls whether the LCH can delay triggering of the SR, and the like. For example, the LCH identifier is an index number of an LCH, and may be used to identify the LCH. The identifier of the logical channel group to which the LCH belongs may be an index number of a logical channel group to which the LCH belongs, and may be used to identify the logical channel group to which the LCH belongs.

Application layer entity: The application layer entity is a protocol layer entity in a device, may be referred to as an application layer or an application entity, and is mainly configured to generate an application (APP) message, a data packet corresponding to a V2X service, or the like.

Non-access stratum (NAS) entity: The non-access stratum layer entity is a protocol layer entity in a device, may be referred to as a NAS layer or a NAS entity, and is mainly configured to process information transmission between a terminal and a core network device. Transmitted content may be user information or control information (such as service establishment or release, or mobility management information). The NAS entity has the following functions: session management (including session establishment, modification, release, and QoS negotiation), user management (including user data management, attachment, detachment, and the like), security management (including authentication and encryption initialization between a user and a network), charging, and the like.

RRC layer entity: The RRC layer entity is a protocol layer entity in a device, and is mainly responsible for generating an RRC message, measurement configuration, and reporting. The RRC layer entity may further be responsible for another function: for example, sending a dedicated NAS message, and transmitting a parameter that reflects quality of service of a data packet/data stream, such as terminal (UE) access capability information.

SDAP layer entity: The SDAP layer entity is a protocol layer entity in a device, may be referred to as an SDAP layer or an SDAP entity, and is mainly configured to maintain a mapping relationship between a QoS parameter and an SLRB. For example, the QoS parameter may be a 5th generation (5G) quality of service identifier (5G QoS identifier, 5QI), a quality of service flow identifier (QoS flow identifier, QFI), a ProSe per packet priority (PPPP), ProSe per-packet reliability (ProSe per packet reliability, PPPR), or the like.

PDCP layer entity: The PDCP layer entity is a protocol layer entity in a device, may be referred to as a PDCP layer or a PDCP entity, and mainly processes an RRC message from a control plane and an internet protocol (IP) packet from a data plane. Functions of the PDCP layer entity include header compression and decompression, encryption/decryption, integrity protection, transmission of user plane data and control plane data, reordering, retransmission, and the like. Each PDCP layer entity has one or two corresponding RLC layer entities.

RLC layer entity: The RLC layer entity is a protocol layer entity in a device, may be referred to as an RLC layer or an RLC entity, and is mainly responsible for segmenting/concatenating and reassembling RLC service data units (SDU), performing error correction by using an automatic repeat request (ARQ), performing reordering and duplicate packet detection on RLC protocol data units (PDU), re-segmenting RLC PDUs, and the like.

MAC layer entity: The MAC layer entity is a protocol layer entity in a device, may be referred to as a MAC layer or a MAC entity, and is mainly responsible for matching a logical channel and a transmission channel, multiplexing a plurality of MAC SDUs that belong to one logical channel or belong to different logical channels to a same MAC PDU, delivering the MAC PDU to a PHY (physical) layer entity, performing error correction by using a hybrid automatic repeat request (HARQ), and performing scheduling, logical channel priority processing, scheduling information reporting, random access process processing, and the like.

PHY layer entity: The PHY layer entity is a protocol layer entity in a device, may be referred to as a PHY layer entity or a PHY entity, and may provide mechanical, electronic, functional, and normative features for setting up, maintaining, and removing a physical link required for data transmission. In brief, the PHY layer entity ensures that original data can be transmitted over a variety of physical media.

The following describes the technical solutions in the embodiments of this application with reference to the accompanying drawings in the embodiments of this application.

The communication methods provided in the embodiments of this application may be applied to any communications system for device-to-device direct communication, for example, may be applied to a device-to-device (device to device, D2D) communications system, a machine-to-machine (machine to machine, M2M) communications system, a V2X communications system, or the like. The following uses the V2X communications system as an example to describe the communication methods provided in the embodiments of this application. For implementation processes of the communication methods in another communications system, refer to the descriptions of the embodiments of this application.

Figure 2:
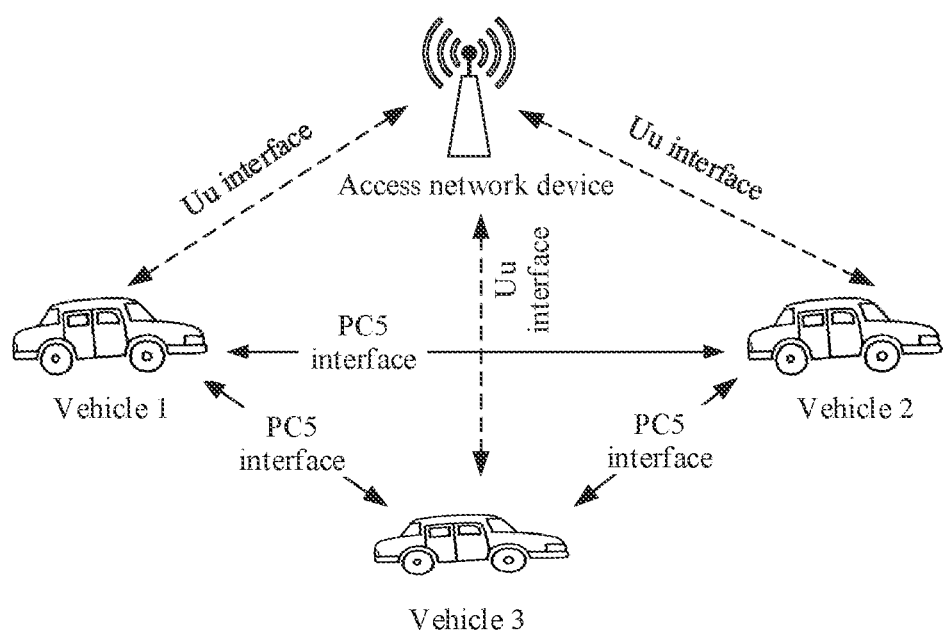
FIG. 2 is a schematic diagram of a system architecture according to an embodiment of this application.

FIG. 2 shows a V2X communications system according to an embodiment of this application. As shown in FIG. 2, the V2X communications system may include a plurality of vehicles (for example, a vehicle 1, a vehicle 2, and a vehicle 3 shown in FIG. 2). A direct communications link may be established between a vehicle and a surrounding vehicle, to implement direct communication. For example, a vehicle 1 and a vehicle 2 may directly communicate with each other. For example, a direct communications link established between vehicles may be defined as a sidelink (SL), and an interface for direct communication between a vehicle and a surrounding vehicle may be referred to as a PC5 interface. The V2X communications system shown in FIG. 2 may further include a radio access network device. A vehicle may send a V2X message to a peer vehicle through forwarding by the radio access network device, or access a network by using the radio access network device. For example, the vehicle 1 may send a V2X message to the radio access network device, and the radio access network device sends the V2X message to the vehicle 2. For example, an interface between the vehicle and the radio access network device may be referred to as a Uu interface. Optionally, the network architecture shown in FIG. 2 is merely an example of an architecture diagram. A quantity of network elements included in the V2X communications system shown in FIG. 2 is not limited in this embodiment of this application. Moreover, in addition to the network function entities shown in FIG. 2, the network shown in FIG. 2 may further include other function entities, for example, an application server and a core network device, although the other function entities are not shown. This is not limited.

Figure 3A:
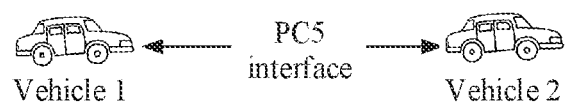
FIG. 3a is a schematic diagram of unicast communication according to an embodiment of this application.
Figure 3B:
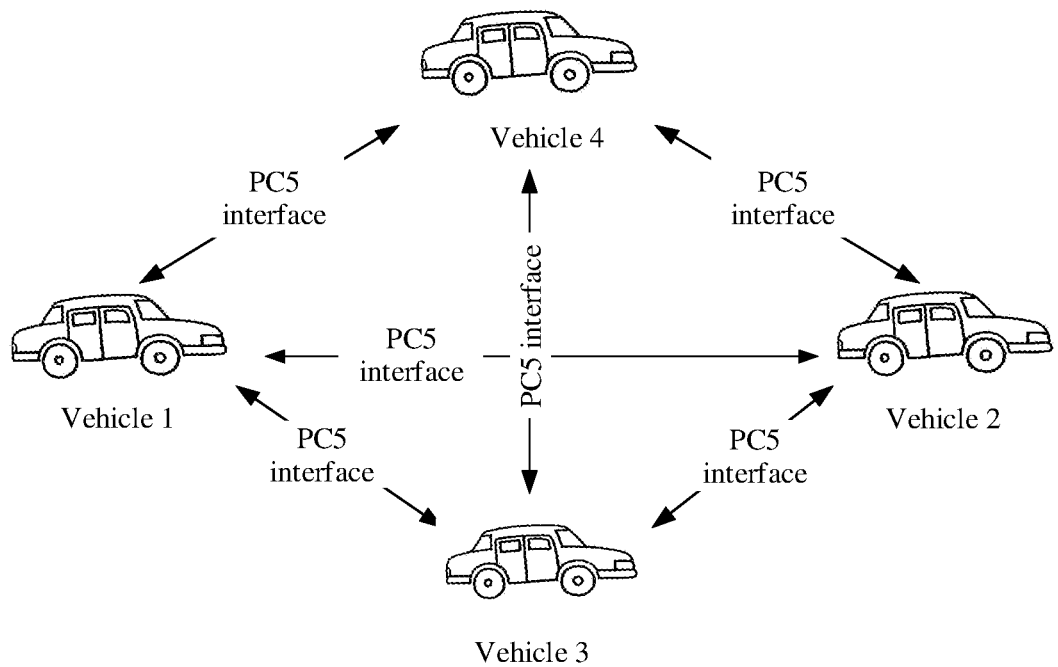
FIG. 3b is a schematic diagram of multicast communication according to an embodiment of this application.

For example, the vehicles in FIG. 2 are not limited to any type of vehicles, such as a vehicle, a bicycle, an electric vehicle, an airplane, a ship, a train, or a high-speed railway. The vehicles may include a vehicle-mounted device that can directly communicate with another device. The vehicle-mounted device may be referred to as user equipment (UE) or a terminal device (terminal). The vehicle may be one-to-one connected to another vehicle in the V2X communications system, that is, may perform unicast communication, or may perform multicast communication with a plurality of other vehicles in the V2X communications system. For example, FIG. 3a is a schematic diagram of unicast communication according to an embodiment of this application. As shown in FIG. 3a, a vehicle 1 may be one-to-one connected to a vehicle 2 to perform unicast communication. FIG. 3b is a schematic diagram of multicast communication according to an embodiment of this application. As shown in FIG. 3b, a vehicle 1 may form a communication group with three other vehicles (a vehicle 2, a vehicle 3, and a vehicle 4), and the vehicles in the communication group perform multicast communication. In this embodiment of this application, an example in which a vehicle is a terminal device is used for description. An apparatus configured to implement a function of the terminal device may be the terminal device, or may be an apparatus, for example, a chip system, that can support the terminal device in implementing the function. In this embodiment of this application, the chip system may include a chip, or may include a chip and another discrete component.

The radio access network device in FIG. 2 is mainly configured to implement functions such as a radio physical control function, resource scheduling and radio resource management, radio access control, and mobility management. The radio access network device may be an access network (AN) device/a radio access network (RAN) device, or may be a device including a plurality of 5G-AN/5G-RAN nodes, or may be a nodeB (NB), an evolved NodeB (eNB), a next generation NodeB (gNB), a transmission reception point (TRP), a transmission point (TP), or any node in other access nodes of a specific type. In this embodiment of this application, an apparatus configured to implement the functions of the radio access network device may be a radio access network device, or may be an apparatus that can support the radio access network device in implementing the functions, for example, a chip system. The technical solutions provided in the embodiments of this application are described by using an example in which the apparatus configured to implement the functions of the radio access network device is the radio access network device.

Figure 4:
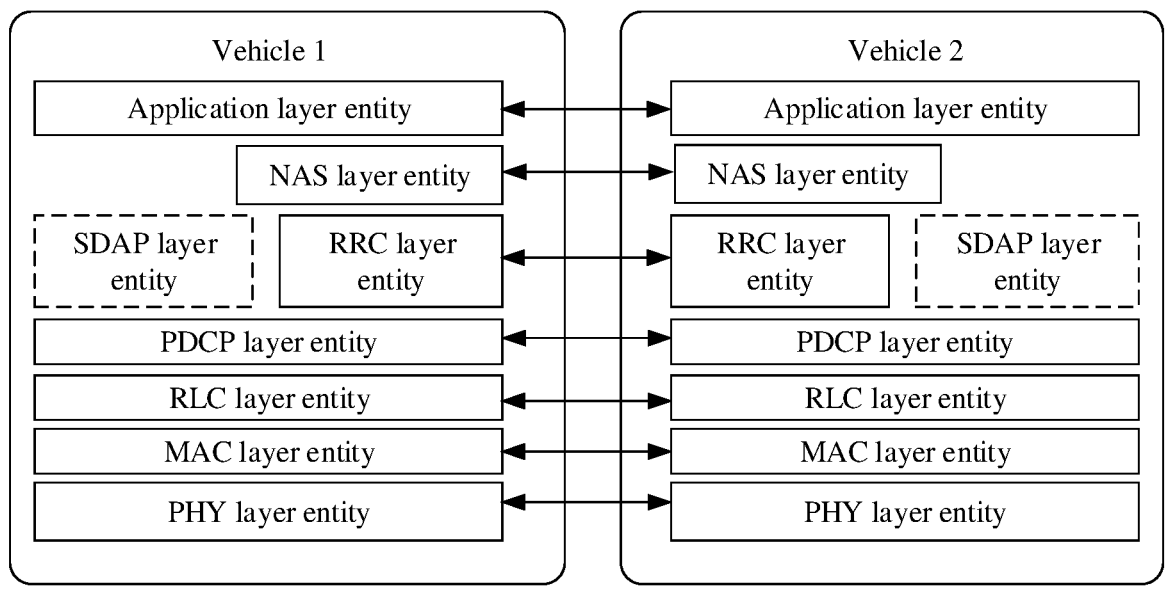
FIG. 4 is a schematic diagram of a protocol stack according to an embodiment of this application.

For example, each vehicle shown in FIG. 2 may include protocol layer entities shown in FIG. 4: an application layer entity, a NAS layer entity, an RRC layer entity, a PDCP layer entity, an RLC layer entity, a MAC layer entity, and a PHY layer entity, and may further include an SDAP layer entity, a V2X layer entity, another newly added protocol layer entity (not shown in FIG. 4), and the like. Related function descriptions and configurations of the protocol layer entities are described above, and details are not described again. Three entities: the MAC layer entity, the RLC layer entity, and the PDCP layer entity may form a data link entity, which is referred to as a layer-2 (layer2, L2). The vehicle may process a transmitted signaling message or data packet by using the protocol layer entities shown in FIG. 4. For example, a data packet is transmitted between a vehicle 1 and a vehicle 2 shown in FIG. 4. RRC layer entities of the vehicle 1 and the vehicle 2 may separately establish corresponding SLRBs for multicast communication and unicast communication, and maintain a correspondence between the unicast communication/multicast communication and the SLRBs. When the vehicle 1 sends a data packet corresponding to multicast communication to the vehicle 2, the vehicle 1 may deliver, based on the correspondence, the data packet to SLRBs corresponding to multicast communication for processing, and send the processed data packet to the vehicle 2 through a PC5 interface. After a MAC layer entity of the vehicle 2 receives the data packet, the MAC layer entity delivers the data packet to the SLRBs that correspond to multicast communication and that are in the vehicle 2 for processing. A process in which the vehicle 1 sends a data packet corresponding to unicast communication to the vehicle 2 is similar to this process, and details are not described again. Correspondingly, as an inverse process of sending a data packet by the vehicle 1 to the vehicle 2, when the vehicle 2 sends a data packet to the vehicle 1, the vehicle 2 may deliver, based on the correspondence between the unicast communication/multicast communication and the SLRBs, the data packet to SLRBs corresponding to the unicast communication/multicast communication for processing, and send the processed data packet to the vehicle 1 through the PC5 interface. After receiving the data packet, a MAC layer entity of the vehicle 1 delivers the data packet to SLRBs that correspond to the unicast communication/multicast communication and that are in the vehicle 1 for processing. Specifically, for this method, refer to FIG. 6.

Optionally, the names of the network elements, the names of the interfaces between the network elements, and the names of the protocol layer entities that are in the architecture in FIG. 2 are merely examples. In specific implementation, the network elements, the interfaces between the network elements, and the protocol layer entities may alternatively have other names. This is not specifically limited in the embodiments of this application.

Figure 5:
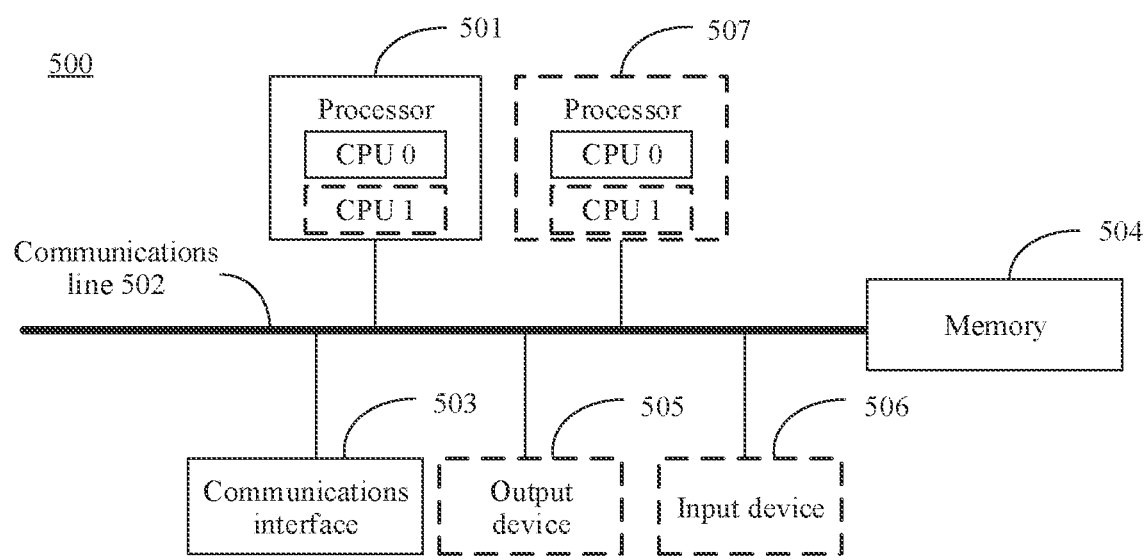
FIG. 5 is a schematic composition diagram of a communications apparatus according to an embodiment of this application.

For example, the vehicle in FIG. 2 may be considered as a communications apparatus shown in FIG. 5 or includes a communications apparatus shown in FIG. 5. FIG. 5 is a schematic composition diagram of a communications apparatus 500 according to an embodiment of this application. The communications apparatus is configured to implement the communication methods provided in the embodiments of this application. As shown in FIG. 5, the communications apparatus 500 includes at least one processor 501, a communications line 502, and at least one communications interface 503. Further, the communications apparatus 500 may further include a memory 504. For example, the processor 501, the memory 504, and the communications interface 503 may be connected by using a communications line 502. In this embodiment of this application, "at least one" may be one, two, three, or more. This is not limited in this embodiment of this application.

In this embodiment of this application, the processor 501 may be a central processing unit (CPU), a general purpose processor, a network processor (NP), a digital signal processor (DSP), a microprocessor, a microcontroller, a programmable logic device (PLD), or any combination thereof. The processor may alternatively be any other apparatus having a processing function, for example, a circuit, a component, or a software module.

In this embodiment of this application, the communications line 502 may include a path, used to transmit information between components included in the communications apparatus.

In this embodiment of this application, the communications interface 503 is configured to communicate with another vehicle or communications network (for example, Ethernet, a radio access network (RAN), or a wireless local area network (WLAN)). The communications interface 503 may be a module, a circuit, a transceiver, or any apparatus that can implement communication.

In this embodiment of this application, the memory 504 may be a read-only memory (ROM) or another type of static storage device that can store static information and/or an instruction, or may be a random access memory (RAM) or another type of dynamic storage device that can store information and/or an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto.

In a possible design, the memory 504 may be independent of the processor 501. To be specific, the memory 504 may be a memory outside the processor 501. In this case, the memory 504 may be connected to the processor 501 through the communications line 502, and is configured to store an instruction or program code. When invoking and executing the instruction or the program code stored in the memory 504, the processor 501 can implement the communication methods provided in the following embodiments of this application. In still another possible design, the memory 504 may alternatively be integrated with the processor 501. To be specific, the memory 504 may be an internal memory of the processor 501. For example, the memory 504 is a cache, and may be configured to temporarily store some data, instruction information, and/or the like.

In a possible implementable manner, the processor 501 may include one or more CPUs, for example, a CPU 0 and a CPU 1 in FIG. 5. In another possible implementable manner, the communications apparatus 500 may include a plurality of processors, for example, the processor 501 and a processor 507 in FIG. 5. In still another possible implementable manner, the communications apparatus 500 may further include an output device 505 and an input device 506. For example, the input device 506 may be a device, for example, a microphone or a joystick, and the output device 505 may be a device, for example, a display screen or a speaker.

The following specifically describes the communication methods provided in the embodiments of this application with reference to FIG. 2 to FIG. 4. It should be noted that in the following embodiments of this application, names of messages between network elements, names of parameters in messages, or the like are merely examples, and there may be other names in a specific implementation. This is not specifically limited in the embodiments of this application.

Figure 6:
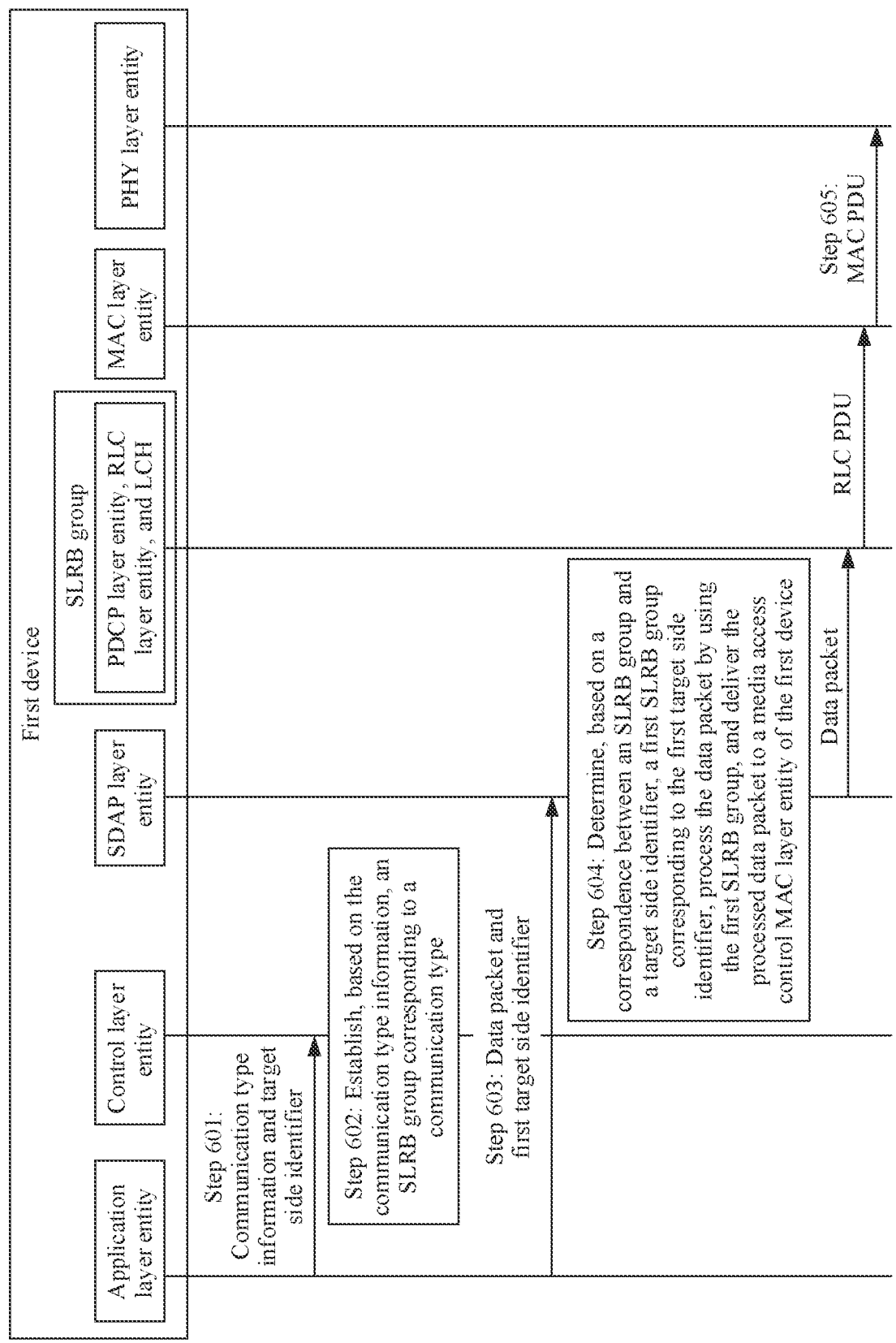
FIG. 6 is a flowchart of a communication method according to an embodiment of this application.

FIG. 6 is a flowchart of a communication method according to an embodiment of this application. As shown in FIG. 6, the method may include the following steps.

Step 601: An application layer entity of a first terminal device delivers communication type information and a target side identifier to a control layer entity of the first terminal device.

For example, the first terminal device may be any vehicle in the V2X system shown in FIG. 2, and may establish the unicast communication shown in FIG. 3*a* or the multicast communication shown in FIG. 3*b* with another vehicle. The first terminal device may include the protocol layer entities shown in FIG. 4. The control layer entity of the first terminal device may be an RRC layer entity of the first terminal device, or a functional module that is in an RRC layer entity of the first terminal device and that is specially configured to control communication performed through an SL interface, a newly added control layer entity (for example, a PC5-C entity) for implementing communication performed through an SL interface, or the like. Optionally, step 6*oi* may alternatively be performed by another protocol layer entity of the first terminal device. For example, the process in step 6*oi* may be performed by a NAS layer entity of the first terminal device.

For example, the communication type information may include or be used to indicate a communication type to be performed by the first terminal device. In the embodiments of this application, the communication type may be the unicast communication shown in FIG. 3*a* or the multicast communication shown in FIG. 3*b*. In this embodiment of this application, the communication type message may be a binary bit number "o" or "i", and is used to indicate a communication type to be performed by the first terminal device. For example, "1" may be used to indicate the unicast communication, and "o" may be used to indicate the multicast communication.

The target side identifier may be a target_id, and may be used to identify unicast communication or multicast communication to be performed by the first terminal device. The target side identifier may be allocated by an application layer entity of a lead vehicle that initiates unicast communication or multicast communication, or allocated by another protocol layer entity (for example, a NAS layer entity) of a lead vehicle that initiates unicast communication or multicast communication. Target side identifiers allocated for different communication types are different. In this embodiment of this application, the lead vehicle that initiates the unicast communication or the multicast communication may be the first terminal device. Optionally, if the communication type is the unicast communication, the target side identifier may not be limited to an identifier allocated by the application layer entity or the another protocol layer entity of the lead vehicle that initiates the unicast communication or the multicast communication, and may alternatively be an identifier of a peer device that performs the unicast communication with the first terminal device, for example, a source layer-2 identifier (source layer-2 id) of a peer device that performs the unicast communication with the first terminal device. For example, assuming that a vehicle 1 is a lead vehicle that initiates unicast communication, and the vehicle 1 and a vehicle 2 form unicast communication, for the vehicle 1, a target side identifier corresponding to the unicast communication may be a target_id 1 allocated by an application layer entity of the vehicle 1, or may be an identifier of the vehicle 2.

Optionally, that an application layer entity of a first terminal device delivers communication type information and a target side identifier to a control layer entity of the first terminal device includes: after the application layer entity of the first terminal device determines that the first terminal device performs unicast communication or multicast communication with another vehicle, the application layer entity of the first terminal device allocates the target side identifier for the unicast communication or the multicast communication, and directly delivers the communication type information and the target side identifier to the control layer entity of the first terminal device; or the application layer entity of the first terminal device delivers the communication type information and the target side identifier to the NAS layer entity of the first terminal device, and the NAS layer entity of the first terminal device delivers the communication type information and the target side identifier to the control layer entity of the first terminal device. To be specific, the application layer entity of the first terminal device may deliver the communication type information and the target side identifier to the control layer entity of the first terminal device by using the NAS layer entity of the first terminal device.

In another optional manner, after the application layer entity of the first terminal device delivers the communication type information to the NAS layer entity of the first terminal device, and the NAS layer entity of the first terminal device receives the communication type information, the NAS layer entity of the first terminal device determines a target side identifier corresponding to unicast communication or multicast communication indicated by the communication type information, and the NAS entity of the first terminal device delivers the communication type information and the target side identifier to the control layer entity of the first terminal device. Alternatively, the NAS layer entity of the first terminal device may be a newly added V2X layer entity in the first terminal device. The V2X layer entity is mainly responsible for transferring a message or a data packet between the application layer entity of the first terminal device and the control layer entity of the first terminal device. Optionally, for a process in which the application layer entity of the first terminal device determines that the first terminal device performs unicast communication or multicast communication with another vehicle, refer to FIG. 7 to FIG. 9. Optionally, after determining the target side identifier corresponding to the unicast communication or the multicast communication, the application layer entity or the NAS layer entity of the first terminal device may maintain a correspondence between the unicast communication or the multicast communication and the target side identifier, and send the correspondence between the unicast communication or the multicast communication and the target side identifier to another member vehicle in the unicast communication or the multicast communication, so that the another member vehicle synchronously learns of the target side identifier corresponding to the unicast communication or the multicast communication, and maintains a correspondence between the target side identifier and SLRBs.

In addition to the communication type information and the target side identifier, the application layer entity (or the NAS layer entity) of the first terminal device may further deliver service information, lead vehicle information, and/or the like to the control layer entity of the first terminal device. The service information may be a destination layer-2 id, used to identify a V2X service type. The lead vehicle information may be used to indicate whether the first terminal device is a lead vehicle that initiates the unicast communication or the multicast communication (unicast communication/multicast communication). For example, the lead vehicle information may be a 1-bit lead vehicle indication (header_indicator). header_indicator=1 indicates that the first terminal device is the lead vehicle, and header_indicator=0 indicates that the first terminal device is a member vehicle (that is, a vehicle other than the lead vehicle in the unicast communication or the multicast communication). Alternatively, the lead vehicle information may be an identifier of the lead vehicle, for example, a source layer-2 id of the lead vehicle. If the identifier of the lead vehicle is the same as an identifier of the first terminal device (for example, the source layer-2 identifier of the first terminal device), the control layer entity of the first terminal device determines that the first terminal device is the lead vehicle that establishes the unicast communication/multicast communication, or otherwise, determines that the first terminal device is a member vehicle.

Optionally, while delivering, downward, a data packet to be sent to the peer device, the application layer entity of the first terminal device may deliver the communication type information and the target side identifier to the control layer entity of the first terminal device. In this case, the communication type information and the target side identifier may be carried in the data packet and delivered downward. Alternatively, before sending the data packet, the application layer entity of the first terminal device may deliver the communication type information and the target side identifier to the control layer entity of the first terminal device.

Step 602: The control layer entity of the first terminal device establishes, based on the communication type information, an SLRB group corresponding to a communication type.

For example, the SLRB group corresponds to the target side identifier. The control layer entity of the first terminal device may store and maintain a correspondence between the SLRB group and the target side identifier, or store the correspondence between the SLRB group and the target side identifier to another protocol layer entity of the first terminal device (for example, an SDAP layer entity of the first terminal device).

That the control layer entity of the first terminal device establishes, based on the communication type information, an SLRB group corresponding to a communication type may include the following steps: The control layer entity of the first terminal device identifies, based on the communication type information, a communication type to be performed by the first terminal device; establishes, for a different communication type, a plurality of SLRBs that meet a quality of service requirement during data packet transmission in the communication type; and determines a configuration of each of a PDCP layer entity, an RLC layer entity, and an LCH that are included in each SLRB. For example, for unicast communication, an RLC entity configuration may be an AM mode, and for multicast communication, the RLC entity configuration may be a UM mode. For the unicast communication, a PDCP SN may have a length of 5 bits, and for the multicast communication, a PDCP SN may have a length of 12 bits; or a PDCP SN may be configured with a length of 12 bits in both the unicast communication and the multicast communication. Optionally, configurations of SLRBs in an SLRB group corresponding to the unicast communication should be different, as much as possible, from configurations of SLRBs in an SLRB group corresponding to the multicast communication, so as to ensure quality of service requirements of data packet transmission in different communication types.

For example, a PDCP entity configuration, an RLC entity configuration, and an LCH configuration that correspond to the unicast communication or the multicast communication may be prestored in the first terminal device, or may be obtained by the first terminal device from a radio access network device. For example, the first terminal device may receive configuration information that is of an SLRR group and that is sent by the radio access network device. Alternatively, the PDCP entity configuration, the RLC entity configuration, and the LCH configuration that correspond to the unicast communication or the multicast communication are obtained by the first terminal device from another member vehicle in the unicast communication or the multicast communication. This is not limited.

Optionally, after establishing an SLRB group, the control layer entity of the first terminal device may further send configuration information of each SLRB in the SLRB group to a control layer entity of another device in the unicast communication or the multicast communication, that is, notify another member vehicle of a configuration of the SLRB group corresponding to the unicast communication or the multicast communication. Specifically, for this method, refer to FIG. 8.

Subsequently, when delivering a data packet, the application layer entity of the first terminal device may deliver, based on the SLRB group that corresponds to the communication type and that is established in step 602, the data packet to the corresponding SLRB group for processing. For example, as shown in FIG. 6, this process may include step 603 to step 605.

Step 603: The application layer entity of the first terminal device delivers a data packet and a first target side identifier to an SDAP layer entity of the first terminal device.

For example, the application layer entity of the first terminal device may directly deliver the data packet and the first target side identifier to the SDAP layer entity of the first terminal device. The data packet may be a data packet in the unicast communication or a data packet in the multicast communication, and the first target side identifier may be used to identify a communication type corresponding to the data packet. For example, if the application layer entity of the first terminal device determines to perform unicast communication with another terminal device, the first target side identifier is used to identify the unicast communication; or if the application layer entity of the first terminal device determines to perform multicast communication with another terminal device, the first target side identifier is used to identify the multicast communication.

In addition to the data packet and the first target side identifier, the application layer entity of the first terminal device may further deliver, to the SDAP layer entity of the first terminal device, service information (destination layer-2 id) of a service type to which the data packet belongs, a QoS parameter, communication type information, and other information. This is not limited.

Step 604: The SDAP layer entity of the first terminal device determines, based on the correspondence between the SLRB group and the target side identifier, a first SLRB group corresponding to the first target side identifier, processes the data packet by using the first SLRB group, and delivers the processed data packet to a media access control MAC layer entity of the first terminal device.

For example, the correspondence between the SLRB group and the target side identifier may be sent by the control layer entity of the first terminal device to the SDAP layer entity of the first terminal device, and the SDAP layer entity of the first terminal device receives and stores the correspondence. Optionally, the correspondence between the SLRB group and the target side identifier is stored in the SDAP layer entity of the first terminal device in a form of a list.

For example, Table 1 is a list of correspondences between SLRB groups and target side identifiers. As shown in Table 1, a target_id 1 corresponds to SLRBs 1, and a target_id 2 corresponds to SLRBs 2. Assuming that the first target side identifier is target_id 1, the SDAP layer entity of the first terminal device may determine, by searching Table 1, that an SLRB group corresponding to the target_id 1 is the SLRBs 1.

TABLE 1

| Target side identifier | SLRB group |
|---|---|
| target_id 1 | SLRBs 1 |
| target_id 2 | SLRBs 2 |

For example, that the SDAP layer entity of the first terminal device processes the data packet by using the first SLRB group, and delivers the processed data packet to the media access control MAC layer entity of the first terminal device may include: The SDAP layer entity of the first terminal device delivers, to a PDCP layer entity corresponding to an SLRB included in the first SLRB group, an SDAP PDU that includes the data packet, the PDCP layer entity receives the SDAP PDU, processes an SDAP SDU included in the SDAP PDU to generate a PDCP PDU, and delivers the PDCP PDU to an RLC layer entity in the SLRB. The RLC layer entity receives the PDCP PDU, processes a PDCP SDU included in the PDCP PDU to generate an RLC PDU, and delivers the RLC PDU to the MAC layer entity of the first terminal device by using an LCH corresponding to the SLRB. Optionally, if the first SLRB group includes a plurality of SLRBs, the SDAP layer entity of the first terminal device may randomly select an SLRB from the first SLRB group, and deliver the SDAP PDU to the SLRB. Alternatively, the SDAP layer entity of the first terminal device delivers, based on a correspondence between a QoS parameter and an SLRB, the SDAP PDU to an SLRB corresponding to a QoS parameter of the data packet. For example, the process may include the following steps.

The application layer entity of the first terminal device delivers a first QoS parameter to the SDAP layer entity of the first terminal device. The SDAP layer entity of the first terminal device determines, based on the correspondence between the QoS parameter and the SLRB, a first SLRB that is in the first SLRB group and that corresponds to the first QoS parameter, processes the data packet by using the first SLRB, and delivers the processed data packet to the MAC layer entity of the first terminal device. The first QoS parameter is used to indicate QoS of a data packet.

For example, a manner in which the first terminal device determines the correspondence between the QoS parameter and the SLRB may be the same as the method in which the first terminal device obtains the SLRB configuration in step 602. The correspondence may be prestored in the first terminal device, or may be obtained by the first terminal device from the radio access network device, or may be obtained by the first terminal device from the another member vehicle in the unicast communication or the multicast communication. This is not limited. Further, the correspondence between the QoS parameter and the SLRB may be used as a part of an SDAP configuration. In this case, the SDAP configuration may be prestored in the first terminal device, or may be obtained by the first terminal device from the radio access network device, or may be obtained by the first terminal device from the another member vehicle in the unicast communication or the multicast communication. This is not limited. Alternatively, the first terminal device has no SDAP layer entity. The correspondence between the QoS parameter and the SLRB may be used as a part of a NAS configuration, and is predefined in a protocol or prestored in the first terminal device. The application layer entity of the first terminal device may send a data packet, the first target side identifier, and the first QoS parameter to the NAS layer entity of the first terminal device. After receiving the data packet, the NAS layer entity of the first terminal device delivers, based on the correspondence between the target side identifier and the SLRBs and the correspondence between the QoS parameter and the SLRB in the SLRBs, the data packet to a PDCP layer entity in a corresponding SLRB for processing.

In addition, the SDAP layer entity of the first terminal device may further receive the communication type information sent by the application layer entity of the first terminal device.

Step 605: The MAC layer entity of the first terminal device processes an RLC SDU included in an RLC PDU to obtain a MAC PDU, and delivers the MAC PDU to a physical PHY layer entity of the first terminal device.

For example, for a process in which the MAC layer entity of the first terminal device processes the RLC SDU included in the RLC PDU to obtain the MAC PDU, refer to the prior art. Details are not described again.

Optionally, while delivering the MAC PDU to the PHY layer entity of the first terminal device, the MAC layer entity of the first terminal device may further deliver any one or more pieces of information of the first target side identifier, the first QoS parameter, and the communication type information to the PHY layer entity of the first terminal device.

Based on the method shown in FIG. 6, corresponding radio bearer groups may be established for different communication types. Subsequently, when data of a specific communication type is sent downward, the data may be processed by using a radio bearer group corresponding to the communication type, so that data of different communication types is processed by using different radio bearer groups, and quality of service requirements of the data of different communication types are controlled and ensured.

The following describes the process shown in FIG. 6 by using an example in which a first terminal device is a vehicle 1, a second terminal device is a vehicle 2, and the vehicle 1 establishes unicast communication/multicast communication with the vehicle 2. A wireless communications link is established between the vehicle 1 and the vehicle 2.

Figure 7A:
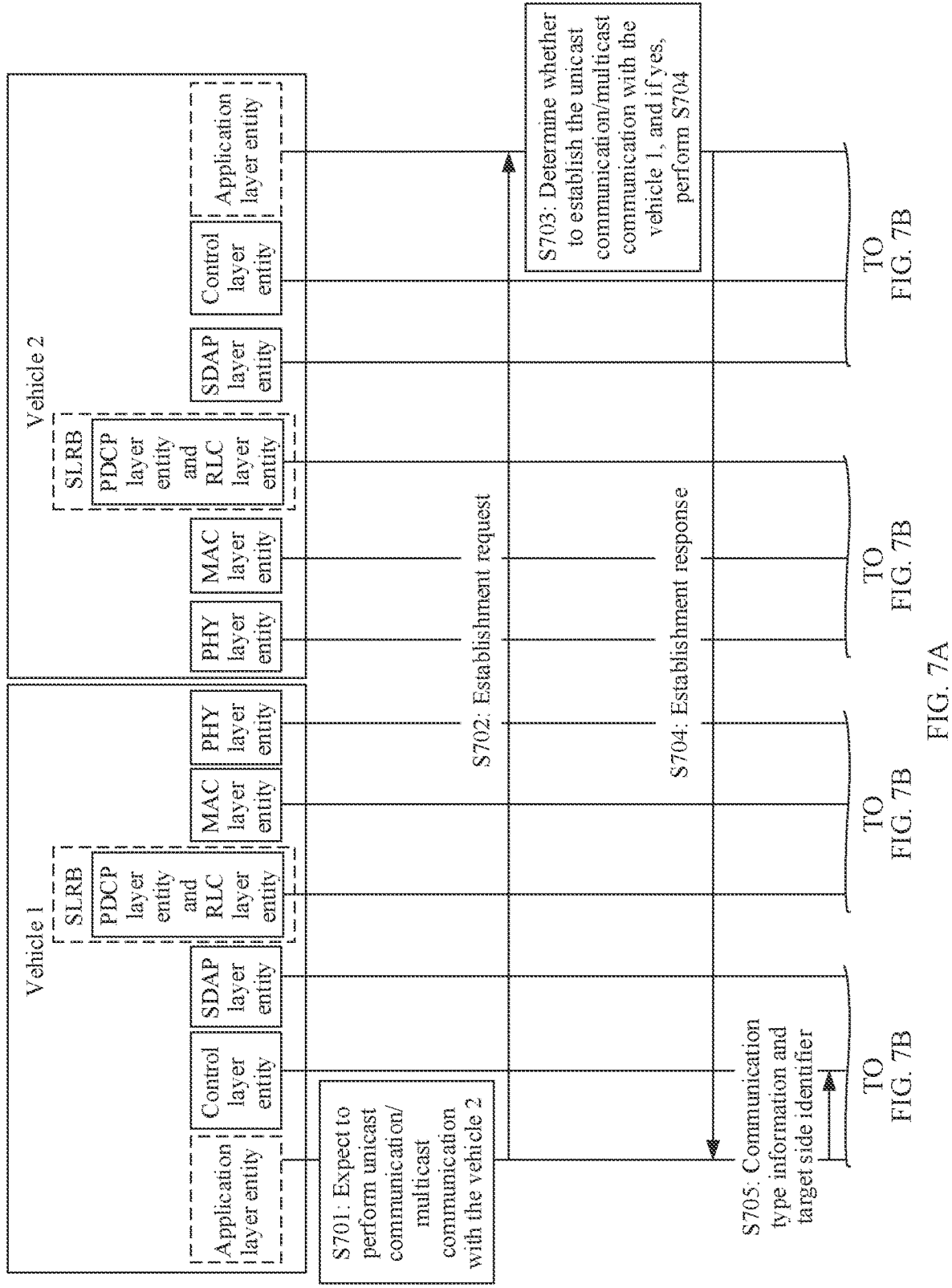
Figure 7B:
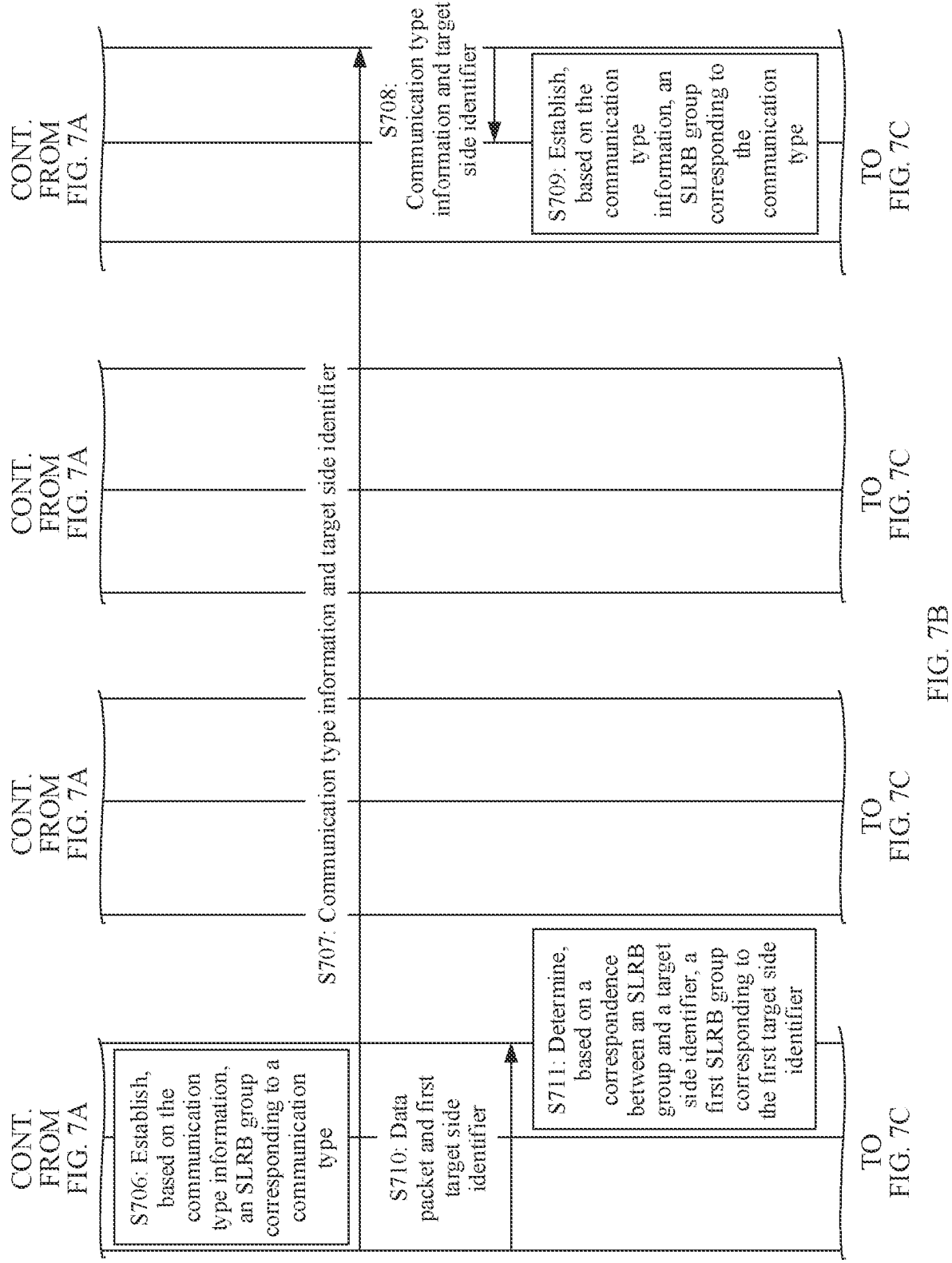

FIG. 7 is a flowchart of another communication method according to an embodiment of this application. As shown in FIG. 7, the method may include the following steps.

S701: An application layer entity of the vehicle 1 expects to perform unicast communication/multicast communication with the vehicle 2.

For example, when performing a vehicle platooning service, the application layer entity of the vehicle 1 may expect to perform the unicast communication or the multicast communication with the vehicle 2 that is in a same driving direction and that is relatively close. Optionally, the unicast communication/multicast communication corresponds to a specific communication service (for example, a V2X service). For example, in the unicast communication, a V2X service has a relatively low latency requirement and a relatively high reliability requirement. In the multicast communication, the V2X service may have a relatively lower latency requirement and a relatively lower reliability requirement.

S702: The application layer entity of the vehicle 1 broadcasts an establishment request.

For example, the establishment request may be used to request to establish the unicast communication/multicast communication. The establishment request may be an APP message. The establishment request may include a V2X service identifier (destination layer-2 id), and may further include other auxiliary information, for example, a driving direction, a destination, and a driving speed of the vehicle 1. Optionally, if the establishment request is used to request to establish the unicast communication, the V2X service identifier included in the establishment request may be an identifier of a vehicle that performs one-to-one unicast communication with the vehicle 1, for example, a source layer-2 id of the vehicle. For example, the vehicle 1 establishes the unicast communication with the vehicle 2. In this case, that the application layer entity of the vehicle 1 broadcasts the establishment request may also be described as that the application layer entity of the vehicle 1 sends the establishment request to an application layer entity of the vehicle 2.

Optionally, that the application layer entity of the vehicle 1 broadcasts the establishment request includes: The application layer entity of the vehicle 1 generates the establishment request, delivers the establishment request downward to a PDCP layer entity, an RLC layer entity, a MAC layer entity, and a PHY layer entity for processing, and then broadcasts the processed establishment request.

S703: The application layer entity of the vehicle 2 receives the establishment request, determines whether to establish the unicast communication/multicast communication with the vehicle 1, and performs S704 if the application layer entity of the vehicle 2 determines to establish the unicast communication/multicast communication with the vehicle 1.

For example, a PHY layer entity of the vehicle 2 receives the establishment request through a wireless communications link (for example, a PC5 interface) established between the vehicle 1 and the vehicle 2, and determines, based on a destination layer-2 id of a service type carried in the establishment request, whether the vehicle 2 is interested in the service of this type. If the vehicle 2 is interested in the service of this type, the PHY layer entity receives the establishment request, and delivers the establishment request to the application layer of the vehicle; otherwise, rejects to receive the establishment request. That the application layer entity of the vehicle 2 determines whether to establish the unicast communication/multicast communication with the vehicle 1 may include: The application layer entity of the vehicle 2 determines whether to join the unicast communication or the multicast communication of the vehicle 1 based on the auxiliary information included in the establishment request. For example, if the vehicle 2 has a same driving direction, destination, and driving speed as the vehicle 1, and is relatively close to the vehicle 1, the application layer entity of the vehicle 2 determines to establish the unicast communication/multicast communication with the vehicle 1; otherwise, determines not to establish the unicast communication/multicast communication with the vehicle 1.

Optionally, if the establishment request is used to request to establish the unicast communication, the application layer entity of the vehicle 2 may further determine whether to establish the unicast communication with the vehicle 1 depending on whether a vehicle identifier carried in the establishment request is an identifier of the vehicle 2. For example, if the vehicle identifier carried in the establishment request is the identifier of the vehicle 2, the application layer entity of the vehicle 2 determines to establish the unicast communication with the vehicle 1; otherwise, determines not to establish the unicast communication with the vehicle 1.

S704: The application layer entity of the vehicle 2 sends an establishment response to the application layer entity of the vehicle 1.

For example, the establishment response is used to instruct to establish the unicast communication/multicast communication with the vehicle 1. The establishment response may include the identifier of the vehicle 2, for example, the source layer-2 id, and may further include communication type information, so that the vehicle 1 learns of a type of communication (unicast communication or multicast communication) to which the establishment response is specific.

For example, the application layer entity of the vehicle 2 may send the establishment response to the vehicle 1 by using a PDCP layer entity, an RLC layer entity, a MAC layer entity, and a PHY layer entity of the vehicle 2. After receiving the establishment response, the PHY layer entity of the vehicle 1 may send the establishment response upward to the application layer entity of the vehicle 1 by using the MAC layer entity, the RLC layer entity, and the PDCP layer entity of the vehicle 1.

S705: The application layer entity of the vehicle 1 receives the establishment response, determines to establish the unicast communication/multicast communication with the vehicle 2, and delivers the communication type information and a target side identifier to a control layer entity of the vehicle 1.

For example, for related descriptions of the communication type information and the target side identifier and a specific implementation of S705, refer to the description of step 601. Details are not described again.

S706: The control layer entity of the vehicle 1 establishes, based on the communication type information, an SLRB group corresponding to the communication type.

Specifically, for S706, refer to step 602. Details are not described again.

S707: The application layer entity of the vehicle 1 sends the communication type information and the target side identifier to the application layer entity of the vehicle 2.

That the application layer entity of the vehicle 1 sends the communication type information and the target side identifier to the application layer entity of the vehicle 2 may include: After processing the communication type information and the target side identifier by using the PDCP layer entity, the RLC layer entity, the MAC layer entity, and the PHY layer entity of the vehicle 1, the application layer entity of the vehicle 1 sends the processed communication type information and target side identifier to the vehicle 2 through a PC5 interface. The PHY layer entity of the vehicle 2 receives the communication type information and the target side identifier, and sends the communication type information and the target side identifier to the application layer entity of the vehicle 2 by using the MAC layer entity, the RLC layer entity, and the PDCP layer entity of the vehicle 2.

Optionally, if the vehicle 1 and the vehicle 2 establish multicast communication, the application layer entity of the vehicle 1 further needs to send identifiers (source layer-2 id) of all member vehicles other than the vehicle 2 in the multicast communication to the application layer entity of the vehicle 2, so that the control function entity of the vehicle 2 establishes corresponding SLRBs for each member vehicle.

S708: The application layer entity of the vehicle 2 delivers the communication type information and the target side identifier to a control layer entity of the vehicle 2.

For example, for a process in which the application layer entity of the vehicle 2 delivers the communication type information and the target side identifier to the control layer entity of the vehicle 2, refer to a process in which the application layer entity of the vehicle 1 delivers the communication type information and the target side identifier to the control layer entity of the vehicle 2. Details are not described again.

If the application layer entity of the vehicle 1 sends the identifiers (source layer-2 id) of all the member vehicles other than the vehicle 2 in the multicast communication to the application layer entity of the vehicle 2, when the application layer entity of the vehicle 2 delivers the communication type information and the target side identifier to the control layer entity of the vehicle 2, the application layer entity of the vehicle 2 may further send the identifiers (source layer-2 id) of all the member vehicles other than the vehicle 2 in the multicast communication to the control layer entity of the vehicle 2, so that the control function entity of the vehicle 2 establishes corresponding SLRBs for each member vehicle.

S709: The control layer entity of the vehicle 2 establishes, based on the communication type information, an SLRB group corresponding to a communication type.

For example, for a process in which the control layer entity of the vehicle 2 establishes, based on the communication type information, the SLRB group corresponding to the communication type, refer to the process in which the control layer entity of the vehicle 1 establishes, based on the communication type information, the SLRB group corresponding to the communication type. Details are not described again.

In this embodiment of this application, a configuration of an SLRB established by a receiving device may be different from a configuration of an SLRB established by a sending device. For example, in the embodiment shown in FIG. 7, the vehicle 1 may be a sending device, and a vehicle 2 may be a receiving device, and a configuration of an SLRB established by the vehicle 2 is slightly different from a configuration of an SLRB established by the vehicle 1. For example, in the configuration of the SLRB established by the vehicle 2, for a PDCP entity configuration, in addition to some configuration parameters included in the PDCP entity configuration described above, the PDCP entity configuration may further include a parameter (outOfOrderDelivery) indicating whether delivery is performed in order, and timing duration (t-Reordering) of a PDCP layer reordering timer. For an RLC entity configuration, the RLC entity configuration includes only one or more of the following configuration parameters: an RLC mode, an SN length used by an RLC PDU, timing duration (t-Reassembly) of a timer for controlling RLC SDU reassembly at the RLC layer, timing duration (t-StatusProhibit) of a timer for controlling status report feedback at the RLC layer, and the like. For an LCH configuration, the LCH configuration includes only an LCH identifier.

S710: The application layer entity of the vehicle 1 delivers a data packet and a first target side identifier to an SDAP layer entity of the vehicle 1.

Specifically, for S710, refer to S603. Details are not described again. In addition, the application layer entity of the vehicle 1 may further send, to the SDAP layer entity of the vehicle 1, other information such as a QoS parameter and communication type information that correspond to the data packet.

Optionally, in this embodiment of this application, S710 may be performed together with S705 and S706. For example, the application layer entity of the vehicle 1 receives an establishment response, determines to establish unicast communication/multicast communication with the vehicle 2, and delivers the data packet, the first target side identifier, the communication type information, and the target side identifier downward. The vehicle 1 establishes a corresponding SLRB group based on the communication type information and the target side identifier. The SDAP layer entity of the vehicle 1 receives the data packet and the first target side identifier, and performs S711. To be specific, when delivering the data packet downward, the vehicle 1 establishes an SLRB group corresponding to the unicast communication or the multicast communication corresponding to the data packet. The SLRB group does not need to be established before the data packet is sent. Subsequently, when another data packet arrives, the data packet is delivered to the SLRB group corresponding to the unicast communication or the multicast communication for processing.

S711: The SDAP layer entity of the vehicle 1 determines, based on a correspondence between an SLRB group and a target side identifier, a first SLRB group that corresponds to the first target side identifier and that is in the vehicle 1, processes the data packet by using the first SLRB group in the vehicle 1, and delivers the processed data packet to the media access control MAC layer entity of the vehicle 1.

For example, for S711, refer to step 604. Details are not described again.

S712: The MAC layer entity of the vehicle 1 processes the received data packet to obtain a MAC PDU, and delivers the MAC PDU to the physical PHY layer entity of the vehicle 1.

For example, for S712, refer to step 605. Details are not described again. In addition, the MAC layer entity of the vehicle 1 may further deliver other information such as the first target side identifier, the QoS parameter corresponding to the data packet, and the communication type information to the physical PHY layer entity of the vehicle 1.

S713: The PHY layer entity of the vehicle 1 delivers the MAC PDU to the PHY layer entity of the vehicle 2.

For example, the PHY layer entity of the vehicle 1 may deliver the MAC PDU to the PHY layer entity of the vehicle 2 through the PC5 interface between the vehicle 1 and the vehicle 2. In addition, the PHY layer entity of the vehicle 1 further sends the first target side identifier, the QoS parameter, the communication type information, and the like to the PHY layer entity of the vehicle 2.

S714: The PHY layer entity of the vehicle 2 delivers the MAC PDU to the MAC layer entity of the vehicle 2.

For example, when receiving the MAC PDU, the PHY layer entity of the vehicle 2 may further receive any one or more pieces of the information such as the first target side identifier, the QoS parameter, and the communication type information, and perform filtering on the received MAC PDU based on the first target side identifier. For example, if the first target side identifier corresponds to the unicast communication or the multicast communication that the vehicle 2 joins, the PHY layer entity of the vehicle 2 determines that the MAC PDU is sent to the vehicle 2, and the PHY layer entity of the vehicle 2 receives the MAC PDU, and delivers the MAC PDU to the MAC layer entity of the vehicle 2. Otherwise, the PHY layer entity of the vehicle 2 determines that the MAC PDU is not sent to the vehicle 2, and discards the MAC PDU.

In addition, the PHY layer entity of the vehicle 2 may further determine a communication type based on the communication type information, and use an appropriate transmission mechanism based on the communication type. For example, if the communication type is unicast communication, a HARQ feedback mechanism is used; otherwise, a HARQ feedback mechanism does not need to be used in transmission.

S715: The MAC layer entity of the vehicle 2 receives a MAC SDU and the first target side identifier, determines, based on the correspondence between the SLRB group and the target side identifier, a first SLRB group that corresponds to the first target side identifier and that is in the vehicle 2, processes the data packet by using the first SLRB group in the vehicle 2, and delivers the processed data packet to the application layer entity of the vehicle 2.

Optionally, S707 to S709 may not be performed. In this case, when delivering a MAC PDU to the PHY layer entity of the vehicle 2, the vehicle 1 may further deliver the communication type information and the target side identifier to the PHY layer entity of the vehicle 2. Optionally, the communication type information and/or the target side identifier may be carried in the MAC PDU. The vehicle 2 establishes, based on the communication type information, an SLRB group corresponding to the communication type, and maintains the correspondence between the SLRB group and the target side identifier. To be specific, when receiving a data packet sent by a peer device, the vehicle 2 establishes corresponding SLRB groups for different communication types, and does not need to establish the SLRB groups in advance. Subsequently, when another data packet arrives, the vehicle 2 delivers the data packet to a corresponding SLRB group for processing.

Based on the method shown in FIG. 7, different SLRBs may be established for different communication types, and data packets transmitted in unicast communication or multicast communication are processed by using SLRBs with different configurations, so that quality of service of data transmitted in the unicast communication or the multicast communication is controlled and ensured.

Figure 8A:
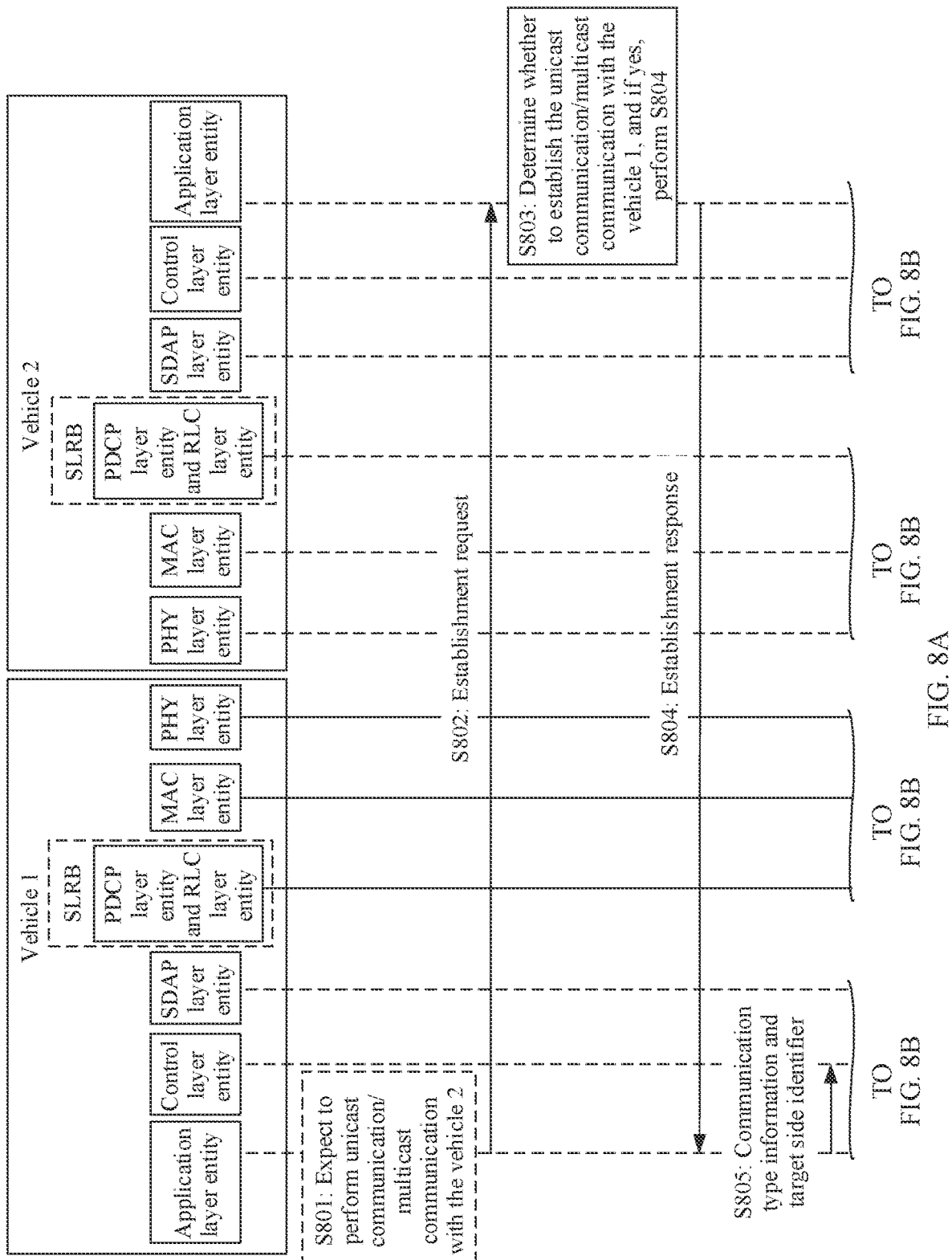
Figure 8B:
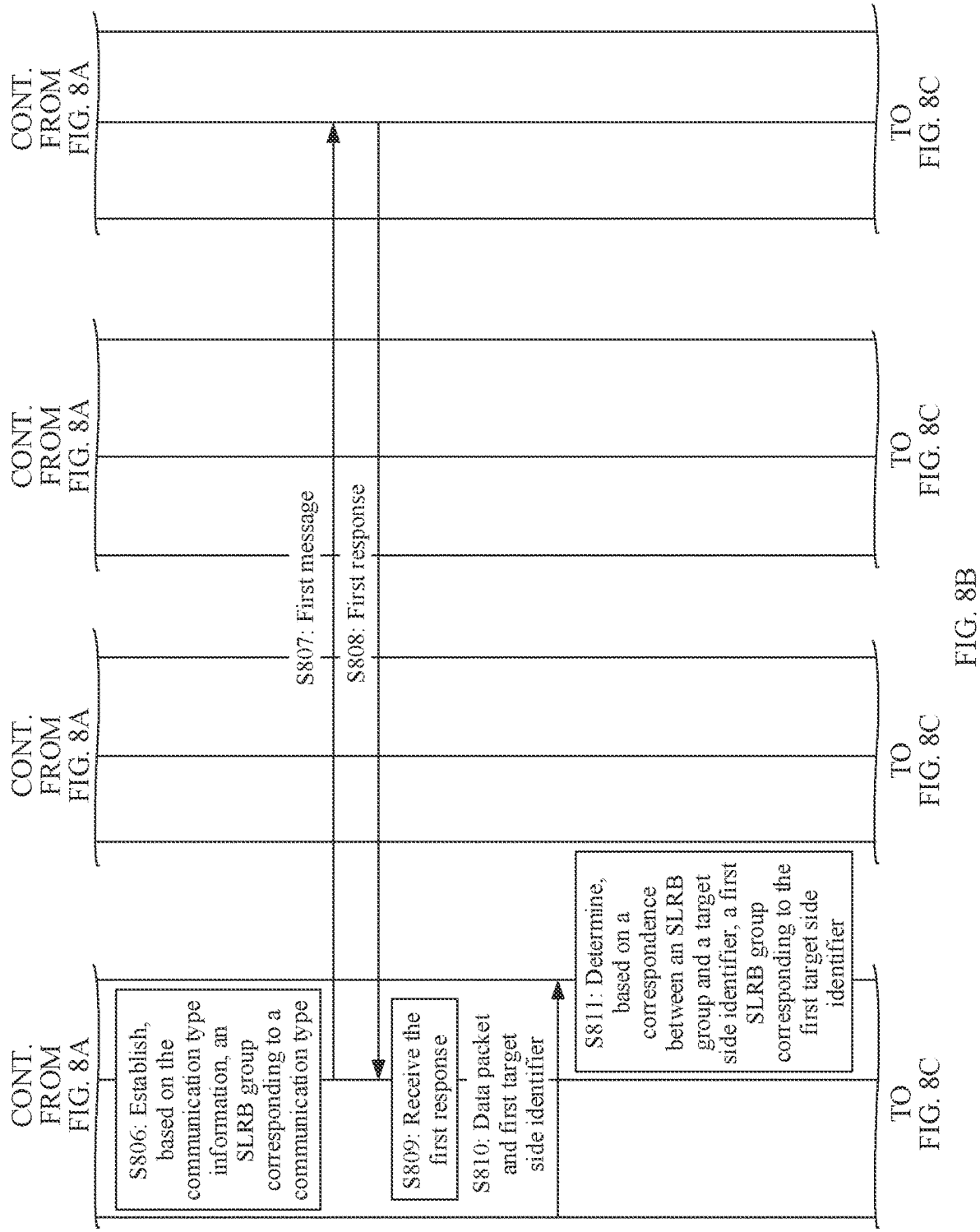

FIG. 8 is a flowchart of another communication method according to an embodiment of this application. As shown in FIG. 8, the method may include the following steps.

S801: An application layer entity of a vehicle 1 expects to establish unicast communication/multicast communication with a vehicle 2.

For example, for S801, refer to S701. Details are not described again.

S802: The application layer entity of the vehicle 1 broadcasts an establishment request.

For example, for S802, refer to S702. Details are not described again.

S803: The application layer entity of the vehicle 2 receives the establishment request, determines whether to establish the unicast communication/multicast communication with the vehicle 1, and performs S804 if the application layer entity of the vehicle 2 determines to establish the unicast communication/multicast communication with the vehicle 1.

For example, for S803, refer to S703. Details are not described again.

S804: The application layer entity of the vehicle 2 sends an establishment response to the application layer entity of the vehicle 1.

For example, for S804, refer to S704. Details are not described again.

S805: The application layer entity of the vehicle 1 receives the establishment response, determines to establish the unicast communication/multicast communication with the vehicle 2, and delivers the communication type information and a target side identifier to a control layer entity of the vehicle 1.

For example, for S805, refer to S705. Details are not described again.

S806: The control layer entity of the vehicle 1 receives the communication type information and the target side identifier, and establishes, based on the communication type information, an SLRB group corresponding to a communication type.

For example, for S806, refer to S706. Details are not described again.

Optionally, in S806, if the control layer entity of the vehicle 1 determines, based on lead vehicle information sent by the application layer entity of the vehicle 1, that the vehicle 1 is a lead vehicle, and the vehicle 1 keeps a connection with a radio access network device, when the control layer function of the vehicle 1 establishes the SLRB group corresponding to the communication type, an SLRB configuration used by the SLRB group may be obtained from the radio access network device by using radio resource control (RRC) dedicated signaling or a system message.

S807: The control layer entity of the vehicle 1 sends a first message to the control layer entity of the vehicle 2.

For example, the first message may be an SLRB configuration message (SLRB_Config message), and the first message includes configuration information of the SLRB group corresponding to the communication type. The control layer entity of the vehicle 1 may send the first message to the control layer entity of the vehicle 2 by using a control plane bearer specially used to send the first message. The control plane bearer used to send the first message includes a PDCP layer entity, an RLC layer entity, and an LCH. In addition, a configuration of the control plane bearer may be predefined in a protocol or preconfigured in the vehicle 1, or may be configured by the radio access network device for the vehicle 1 by using a control message. For example, for the unicast communication, the configuration of the control plane bearer is as follows: An RLC entity configuration is an AM mode, an LCH identifier in an LCH configuration is 0, and so on. For multicast communication, the configuration of the control plane bearer is as follows: An RLC entity configuration is a UM mode.

For the unicast communication, the first message may further include at least one of the following: an SDAP configuration and the target side identifier (target_id). For example, the target side identifier (target_id) may be included in the first message, or may be obtained by the control layer entity of the vehicle 2 from another place. For the multicast communication, the first message may further include at least one of the following: an SDAP configuration, a target_id, and an identifier list including identifiers of all member vehicles that receive the SLRB_Config message. The SDAP configuration may include a mapping relationship between a QoS parameter and an SLRB.

It may be understood that, in this embodiment of this application, if each vehicle has no SDAP layer entity, an NAS layer entity may use a preconfigured mapping between a QoS parameter and an SLRB identifier. In this case, the first message may not include the SDAP configuration.

S808: The control layer entity of the vehicle 2 receives the first message, and sends a first response to the control layer entity of the vehicle 1.

For example, the first response may be an SLRB configuration response.

For the unicast communication, the first response may include at least one of the following: a target_id and a source layer-2 id of a member vehicle (for example, an identifier of the vehicle 2), or may not include the two pieces of information.

For the multicast communication, the first response may include at least one of the following: a target_id and a source layer-2_id of a member vehicle (for example, an identifier of the vehicle 2), or may not include the two pieces of information.

S809: The control layer entity of the vehicle 1 receives the first response.

Optionally, in duration greater than or equal to specified duration, if the control layer entity of the vehicle 1 does not receive the first response sent by the control layer entity of the vehicle 2, the control layer entity of the vehicle 1 re-sends the first message to the control layer entity of the vehicle 2. For example, the preset duration may be set as required. This is not limited.

In this case, "an identifier list including identifiers of all member vehicles that receive the SLRB_Config message" in the resent first message may be replaced with "a list including identifiers of all member vehicles that do not feed back an SLRB_Config response", and the member vehicles that do not feed back the SLRB_Config response are specified. It should be noted that, if the SLRB_Config message does not indicate "a member vehicle that does not feed back an SLRB_Config response", it indicates that all member vehicles need to receive the SLRB_Config message and feed back an SLRB_Config response.

S810: The application layer entity of the vehicle 1 delivers a data packet and a first target side identifier to an SDAP layer entity of the vehicle 1.

For example, for S810, refer to S710. Details are not described again.

S811: The SDAP layer entity of the vehicle 1 receives a data packet and a first target side identifier, determines, based on a correspondence between an SLRB group and a target side identifier, a first SLRB group that corresponds to the first target side identifier, processes the data packet by using the first SLRB group, and delivers the processed data packet to the media access control MAC layer entity of the vehicle 1.

For example, for S811, refer to S711. Details are not described again.

S812: The MAC layer entity of the vehicle 1 processes the received data packet to obtain a MAC PDU, and delivers the MAC PDU to a physical PHY layer entity of the vehicle 1.

For example, for S812, refer to S712. Details are not described again.

S813: The PHY layer entity of the vehicle 1 receives the MAC PDU, and sends the MAC PDU to a PHY layer entity of the vehicle 2 by using the PHY layer entity of the vehicle 1.

For example, for S813, refer to S713. Details are not described again.

S814: The PHY layer entity of the vehicle 2 receives the MAC PDU, and delivers the MAC PDU to a MAC layer entity of the vehicle 2.

For example, for S814, refer to S714. Details are not described again.

S815: The MAC layer entity of the vehicle 2 receives a MAC SDU and the first target side identifier, determines, based on the correspondence between the SLRB group and the target side identifier, the first SLRB group that corresponds to the first target side identifier, processes the data packet by using the first SLRB group, and delivers the processed data packet to the application layer entity of the vehicle 2.

For example, for S815, refer to S715. Details are not described again.

Optionally, in the method shown in FIG. 8, to ensure transmission security of the SLRB configuration information, the method further includes: The control layer entity of the vehicle 1 and the control layer entity of the vehicle 2 determine a security mode configuration. The security mode configuration may be used to define some rules that need to be followed when PDCP layer entities that are of the vehicle 1 and the vehicle 2 and that correspond to the control plane bearers perform protection processing on the first message. The protection processing includes confidentiality protection and integrity protection, and the security mode configuration may include any one or more pieces of the following information: a security algorithm, a key index, and a data protection input parameter.

For example, the security mode configuration may be preconfigured in the vehicle 1, or may be determined by the vehicle 1 based on a security mode message (or a security mode command) sent by the radio access network device, or based on a security mode message (or a security mode command) sent by another vehicle (for example, another vehicle that performs unicast communication or multicast communication with the vehicle 1). Similarly, a manner in which the vehicle 2 determines the security mode configuration is the same as a manner in which the vehicle 1 determines the security mode configuration. Details are not described again. Optionally, the security mode message (or the security mode command) may include the security mode configuration.

When the control layer entity of the vehicle 1 sends the first message to the control layer entity of the vehicle 2, the first message is sent to the vehicle 2 after the PDCP layer entity of the vehicle 1 performs protection processing on the first message based on the security mode configuration. The PDCP layer entity of the vehicle 2 receives the processed first message, performs decryption and integrity check on the SLRB first message based on the security mode configuration, and delivers the SLRB first message obtained after the decryption and integrity check to the control layer entity of the vehicle 2.

Based on the method shown in FIG. 8, a vehicle may send an SLRB configuration configured by the vehicle to another member in unicast communication or multicast communication, so that the another member in the unicast communication or the multicast communication processes a data packet by using the received SLRB configuration. This can not only ensure that devices in the unicast communication or the multicast communication use a same SLRB configuration, but also reduce signaling overheads caused by configuring SLRBs by the members in the unicast communication or the multicast communication. In addition, different SLRBs may be established for different communication types, and different data packets transmitted in the unicast communication or the multicast communication are processed by using SLRBs with different configurations, so that quality of service of the different data transmitted in the unicast communication or the multicast communication is controlled and ensured.

FIG. 7 and FIG. 8 are described by using only an example in which the vehicle 1 sends a data packet to the vehicle 2, to be specific, by using an example in which the vehicle 1 is a sending device, and the vehicle 2 is a receiving device. It may be understood that the vehicle 2 may also be used as a sending device, and the vehicle 1 may be used as a receiving device, that is, the vehicle 2 sends a data packet to the vehicle 1. When the vehicle 2 sends a data packet to the vehicle 1, for a process of processing a data packet by the vehicle 2, refer to S710 to S713, and for a process of processing the received data packet by the vehicle 1, refer to S714 to S715. Alternatively, for a process of processing a data packet by the vehicle 2, refer to S810 to S813, and for a process of processing the received data packet by the vehicle 1, refer to S814 to S815.

Figure 9:
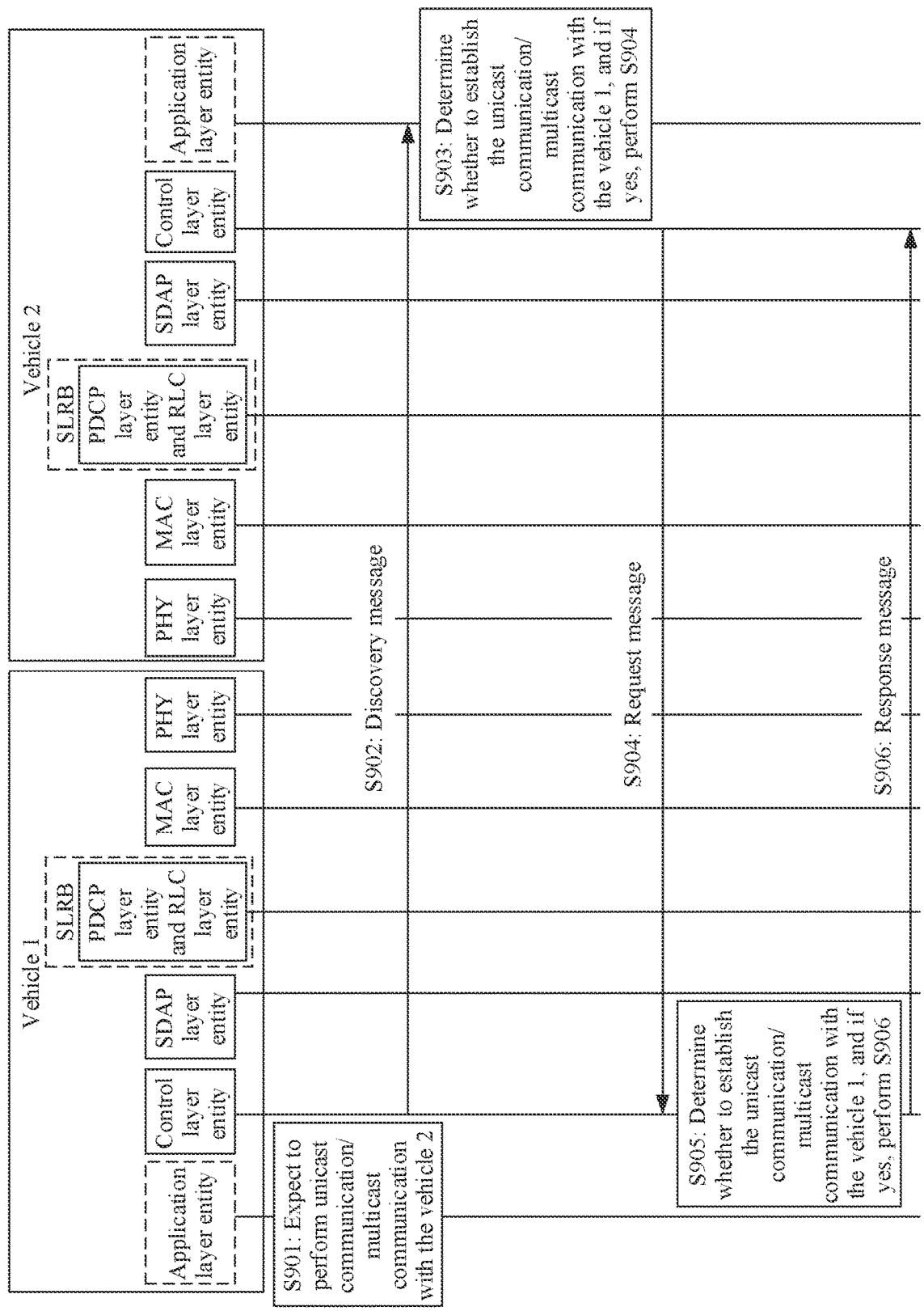
FIG. 9 is a flowchart of establishing unicast communication or multicast communication according to an embodiment of this application.

Different from the method for establishing unicast communication or multicast communication in S701 to S705 or S8*oi* to S805, an embodiment of this application further provides a method for establishing unicast communication or multicast communication. For example, as shown in FIG. 9, the method may include the following steps.

S901: An application layer entity of a vehicle 1 expects to establish unicast communication/multicast communication with a vehicle 2.

Specifically, for S901, refer to S701. Details are not described again.

S902: A control layer entity of the vehicle 1 broadcasts a discovery message.

For example, the application layer entity of the vehicle 1 may instruct the control layer entity of the vehicle 1 to broadcast a discovery message (discoveryMsg).

The discovery message may be an RRC message, and the discovery message is used to discover the vehicle 1. The discovery message may include an identifier (a source address), a destination address, and the like of the vehicle 1, and the destination address may be a destination layer-2 id of a service type. Based on different communication types, the discovery message may be a unicast discovery message or a multicast discovery message. For example, there may be a 1-bit communicationType field in DiscoveryMsg, where communicationType=1 indicates a unicast discovery message, and communicationType=0 indicates a multicast discovery message.

Optionally, the control layer entity of the vehicle 1 may broadcast the discovery message by using a special control plane bearer. The control plane bearer may include a PDCP layer entity, an RLC layer entity, and an LCH. The control plane bearer uses a protocol-predefined/preconfigured configuration parameter. For example, an RLC entity configuration is a TM mode, and an LCH configuration is that an LCH identifier is 0.

Optionally, that a control layer entity of the vehicle 1 broadcasts a discovery message may be alternatively replaced with that the application layer entity of the vehicle 1 broadcasts a discovery message. In other words, the broadcast message may be an APP message.

S903: The application layer entity of the vehicle 2 receives the discovery message, determines whether to establish the unicast communication/multicast communication with the vehicle 1, and performs S904 if the application layer entity of the vehicle 2 determines to establish the unicast communication/multicast communication with the vehicle 1.

Specifically, for S903, refer to S703. Details are not described again.

S904: A control layer entity of the vehicle 2 sends a request message to the control layer entity of the vehicle 1.

The request message may be used to request to establish the unicast communication or the multicast communication with the vehicle 1. The request message may include an identifier (a source address) of the vehicle 2 and an identifier (a destination address) of the vehicle 1. Optionally, the identifier (the source address) of the vehicle 2 and the identifier (the destination address) of the vehicle 1 may not be included in the request message, and may be included in sidelink control information (SL control information, SCI) or a MAC PDU and sent to the control layer entity of the vehicle 1.

For example, the application layer entity of the vehicle 2 may instruct the control layer entity of the vehicle 2 to send the request message. The control plane entity of the vehicle 2 may send the request message by using a special control plane bearer. The control plane bearer may include a PDCP layer entity, an RLC layer entity, and an LCH. The control plane bearer uses a protocol-predefined/preconfigured configuration parameter. For example, an RLC entity configuration is an AM mode, and an LCH identifier in an LCH configuration is 1.

Optionally, the vehicle 2 may send the request message through unicast, multicast, or broadcast. When the request message is sent through broadcast, a destination address in the request message may be a destination layer-2 id.

S905: The control layer entity of the vehicle 1 receives the request message, determines whether to establish the unicast communication/multicast communication with the vehicle 2, and performs S906 if the control layer entity of the vehicle 1 determines to establish the unicast communication/multicast communication with the vehicle 2.

For example, for S905, refer to S903. Details are not described again.

S906: The control layer entity of the vehicle 1 sends a response message to the control layer entity of the vehicle 2.

The response message may be used to instruct the vehicle 1 to determine to establish the unicast communication or the multicast communication. The response message may include the identifier (the source address) of the vehicle 1, the destination address (the identifier of the vehicle 2), and the like. Optionally, the identifier (the source address) of the vehicle 1 and the destination address (the identifier of the vehicle 2) may not be included in the response message, and may be included in SCI or a MAC PDU and sent to the control layer entity of the vehicle 2.

For example, the control layer entity of the vehicle 1 may send the response message to the control layer entity of the vehicle 2 by using a special control plane bearer. The control plane bearer may include a PDCP layer entity, an RLC layer entity, and an LCH. The control plane bearer uses a protocol-predefined/preconfigured configuration parameter. For example, an RLC entity configuration is an AM mode, and an LCH identifier in an LCH configuration is 1.

Optionally, the vehicle 1 may send the response message through unicast, multicast, or broadcast.

S907: The control layer entity of the vehicle 2 receives the response message, and determines, based on the response message, that the vehicle 2 has established the unicast communication or the multicast communication with the vehicle 1. In this case, the control layer entity of the vehicle 2 may maintain a correspondence between a target_id and a communication type.

Optionally, in the method shown in FIG. 9, S902 may not be performed. When S902 is not performed, before performing S903, the vehicle 2 needs to learn of information such as the identifier of the vehicle 1. For example, the vehicle 2 may obtain, from a network device or in another manner, information such as an identifier of another member that establishes the unicast communication or the multicast communication with the vehicle 2.

Based on the method shown in FIG. 9, unicast communication or multicast communication may be established between devices by using a control layer entity.

The foregoing mainly describes the solutions provided in the embodiments of this application from a perspective of interaction between the network elements. It may be understood that to implement the foregoing functions, the first terminal device, the second terminal device, and the radio access network device each include a corresponding hardware structure and/or software module for performing each function. A person of ordinary skill in the art should easily be aware that, in combination with the examples described in the embodiments disclosed in this specification, units and algorithms S in this application may be implemented by hardware or a combination of hardware and computer software. Whether a function is performed by hardware or hardware driven by computer software depends on particular applications and design constraints of the technical solutions. A person skilled in the art may use a different method to implement a described function for each particular application, but it should not be considered that the implementation goes beyond the scope of this application.

In the embodiments of this application, the first terminal device, the second terminal device, and the radio access network device may be divided into functional modules according to the foregoing method examples. For example, each functional module may be obtained through division corresponding to each function, or two or more functions may be integrated into one processing module. The integrated module may be implemented in a form of hardware, or may be implemented in a form of a software functional module. Optionally, in the embodiments of this application, division into modules is used as an example, and is merely logical function division. In actual implementation, another division manner may be used.

Figure 10:
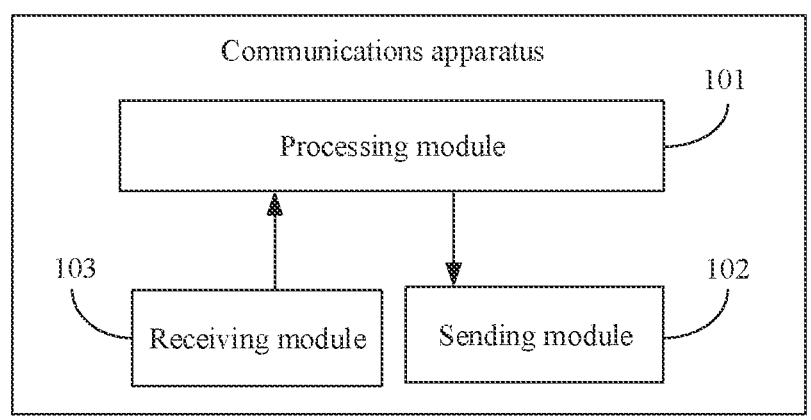
FIG. 10 is a schematic composition diagram of a communications apparatus according to an embodiment of this application.

FIG. 10 is a schematic composition diagram of a communications apparatus 100. The communications apparatus 100 may be a first terminal device, or a chip or a system-on-a-chip in a first terminal device. The communications apparatus 100 may be configured to perform a function of the first terminal device in the foregoing embodiments. In a possible implementation, the communications apparatus 100 shown in FIG. 10 includes a processing module 101 and a sending module 102.

For example, the processing module 101 has the functions of the application layer entity, the control layer entity, the SDAP layer entity, the PDCP layer entity, the RLC layer entity, and the MAC layer entity in the first terminal device. For example, the processing module 101 may include an application layer entity, a control layer entity, an SDAP layer entity, a PDCP layer entity, an RLC layer entity, and a MAC layer entity in the communications apparatus 100. The processing module 101 may process data packets of different communication types by using different configurations, to meet QoS requirements of the data packets of different communication types. The sending module 102 has the function of the PHY layer entity in the first terminal device, and may receive data or information sent by a device other than the communications apparatus 100.

The processing module 101 is configured to establish, based on communication type information, a radio bearer group that is of a sidelink and that corresponds to a communication type. For example, the radio bearer group of the sidelink corresponds to a target side identifier, and the sidelink is a wireless communications link between the communications apparatus 100 and a second terminal device. The communication type is unicast communication or multicast communication. For example, the processing module 101 has the function of the control layer function entity of the first terminal device, and may support the communications apparatus 100 in performing steps 602, S706, and S806.

In a possible design, configuration information of the radio bearer group of the sidelink is prestored in the communications apparatus 100. Alternatively, as shown in FIG. 10, the communications apparatus may further include: a receiving module 103, configured to receive configuration information that is of the radio bearer group of the sidelink and that is sent by the radio access network device.

In a possible design, the processing module 101 sends a first message to a control layer entity of the second terminal device by using the sending module 102, and receives, by using the receiving module 103, a first response sent by the second terminal device. The communications apparatus 100 and the second terminal device are performing or are about to perform the unicast communication or the multicast communication, and the first message includes the configuration information of the radio bearer group of the sidelink.

For example, the processing module 101 may support the communications apparatus 100 in performing S807 and S808.

In a possible design, the method further includes: in duration greater than or equal to specified duration, if the processing module 101 does not receive the first response by using the receiving module 103, the processing module 101 re-sends, by using the sending module 102, the first message to the control layer entity of the second terminal device.

In a possible design, the method further includes: the processing module 101 determines a security mode configuration; and after performing confidentiality protection and integrity protection on the first message based on the security mode configuration, sends, by using the sending module 102, the first message to the control layer entity of the second terminal device, where the security mode configuration is used to instruct the communications apparatus 100 to perform the confidentiality protection and the integrity protection on the first message.

Further optionally, the processing module 101 is further configured to: determine, based on a correspondence between the radio bearer group of the sidelink and the target side identifier, a first radio bearer group that is of the sidelink and that corresponds to the first target side identifier, deliver the data packet to the first radio bearer group of the sidelink, and send the data packet out by using the sending module 102.

In a possible design, the method further includes: the processing module 101 delivers any one or more pieces of information of the first target side identifier, the first QoS parameter, and the communication type information to the sending module 102, so that the sending module 102 sends any one or more pieces of information of the first target side identifier, the first QoS parameter, and the communication type information to another device in the unicast communication or the multicast communication.

In a possible design, the method further includes: the processing module 101 broadcasts an establishment request by using the sending module 102, and receives an establishment response by using the receiving module 103, where the establishment request is used to request to establish the unicast communication or the multicast communication, and the establishment response is used to instruct to establish the unicast communication or the multicast communication with the communications apparatus 100. For example, the processing module 101 may support the communications apparatus 100 in performing S702 and S704.

In a possible design, the method further includes: the processing module 101 receives a request message by using the receiving module 103, and sends a response message by using the sending module 102, where the request message is used to request to establish the unicast communication or the multicast communication with the communications apparatus 100; and the response message is used to instruct the communications apparatus 100 to determine to establish the unicast communication or the multicast communication. For example, the processing module 101 may support the communications apparatus 100 in performing S904 and S905.

In a possible design, the method further includes: the processing module 101 broadcasts a discovery message by using the sending module 102, where the discovery message is a radio resource control RRC message, and the discovery message is used to discover the communications apparatus 100. For example, the processing module 101 may support the communications apparatus 100 in performing S902.

Optionally, all related content of the steps in the foregoing method embodiments may be cited in function descriptions of corresponding functional modules. Details are not described herein again. The communications apparatus provided in this embodiment of this application is configured to perform the functions of the first terminal device in the foregoing communication method, and therefore can achieve a same effect as the foregoing communication method.

For example, the processing module 101 may be one or more processors, and the sending module 102 and the receiving module 103 may be communications interfaces that interact with another network element or device outside the communications apparatus. When the processing module 101 is one or more processors, and the sending module 102 and the receiving module 103 are integrated into a communications interface, the communications apparatus 100 may be the communications apparatus shown in FIG. 5.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, a computer, a server, or a data center to another website, computer, server, or data center in a wired (for example, a coaxial cable, an optical fiber, or a digital subscriber line (DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state drive, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprising" does not exclude another component or another step, and "a" or "one" does not exclude a case of a plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is obvious that various modifications and combinations may be made to them without departing from the spirit and scope of this application. Correspondingly, the specification and accompanying drawings are merely example descriptions of this application defined by the appended claims, and are intended to cover any of or all modifications, variations, combinations, or equivalents within the scope of this application. Clearly, a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. A communication method, wherein the method comprises:
sending, at a first protocol layer entity of a first terminal device, communication type information and a target side identifier to a second protocol layer entity of the first terminal device, wherein the communication type information identifies a unicast communication, and the target side identifier comprises an identifier of a second terminal device; and
establishing, at the second protocol layer entity of the first terminal device, at least one radio bearer for unicast communication, wherein the at least one radio bearer corresponds to the target side identifier.

2. The method according to claim 1, wherein configuration information of the at least one radio bearer is prestored in the first terminal device.

3. The method according to claim 1, wherein the method further comprises:
sending, at the second protocol layer entity of the first terminal device, a first message to a second protocol layer entity of the second terminal device, wherein the first terminal device and the second terminal device are performing or are to perform the unicast communication, and the first message comprises configuration information of the at least one radio bearer; and
receiving, at the second protocol layer entity of the first terminal device, a second message in response to the first message from the second terminal device.

4. The method according to claim 3, wherein the method further comprises:
when the second protocol layer entity of the first terminal device does not receive the second message in a duration greater than or equal to a specified duration, resending, at the second protocol layer entity of the first terminal device, the first message to the second protocol layer entity of the second terminal device.

5. The method according to claim 3, wherein the method further comprises:
determining, at the second protocol layer entity of the first terminal device, a security mode configuration that is to be used by the first terminal device to perform confidentiality protection and integrity protection on the first message; and
wherein sending, at the second protocol layer entity of the first terminal device, the first message to the second protocol layer entity of the second terminal device comprises: sending, at the second protocol layer entity of the first terminal device, the first message and the security mode configuration to a packet data convergence protocol (PDCP) layer entity of the first terminal device, wherein after performing the confidentiality protection and the integrity protection on the first message based on the security mode configuration, the PDCP layer entity of the first terminal device sends the first message to the second protocol layer entity of the second terminal device.

6. The method according to claim 1, wherein the method further comprises:
broadcasting, at the first protocol layer entity of the first terminal device, an establishment request, wherein the establishment request requests to establish the unicast communication; and
receiving, at the first protocol layer entity of the first terminal device, an establishment response, wherein the establishment response indicates to establish the unicast communication with the first terminal device.

7. A communication apparatus, comprising:
at least one processor, and a memory storing instructions that are executable by the at least one processor;
wherein, when executed, the instructions cause the apparatus to perform operations comprising:
sending, at a first protocol layer entity of the communication apparatus, communication type information and a target side identifier to a second protocol layer entity of the communication apparatus, wherein the communication type information identifies a unicast communication, and the target side identifier comprises an identifier of a second terminal device; and
establishing, at the second protocol layer entity of the communication apparatus, at least one radio bearer for unicast communication, wherein the at least one radio bearer corresponds to the target side identifier.

8. The communication apparatus according to claim 7, wherein configuration information of the at least one radio bearer is prestored in the communication apparatus.

9. The communication apparatus according to claim 7, wherein, when executed, the instructions cause the communication apparatus further to perform:
sending, at the second protocol layer entity of the communication apparatus, a first message to a second protocol layer entity of the second terminal device, wherein the communication apparatus and the second terminal device are performing or are to perform the unicast communication, and the first message comprises configuration information of the at least one radio bearer; and
receiving, at the second protocol layer entity of the communication apparatus, a second message in response to the first message from the second terminal device.

10. The communication apparatus according to claim 9, wherein, when executed, the instructions cause the communication apparatus further to perform:
when the second protocol layer entity of the communication apparatus does not receive the second message in a duration greater than or equal to a specified duration, resending, at the second protocol layer entity of the communication apparatus, the first message to the second protocol layer entity of the second terminal device.

11. The communication apparatus according to claim 9, wherein, when executed, the instructions cause the communication apparatus further to perform:
determining, at the second protocol layer entity of the communication apparatus, a security mode configuration that is to be used by the communication apparatus to perform confidentiality protection and integrity protection on the first message; and
wherein sending, by the second protocol layer entity of the communication apparatus, the first message to the second protocol layer entity of the second terminal device comprises: sending, at the second protocol layer entity of the communication apparatus, the first message and the security mode configuration to a packet data convergence protocol (PDCP) layer entity of the communication apparatus, wherein after performing the confidentiality protection and the integrity protection on the first message based on the security mode configuration, the PDCP layer entity of the communication apparatus sends the first message to the second protocol layer entity of the second terminal device.

12. The communication apparatus according to claim 7, wherein, when executed, the instructions cause the communication apparatus further to perform:
broadcasting, at the first protocol layer entity of the communication apparatus, an establishment request, wherein the establishment request requests to establish the unicast communication; and
receiving, at the first protocol layer entity of the communication apparatus, an establishment response, wherein the establishment response indicates to establish the unicast communication with the communication apparatus.

13. A non-transitory memory storage medium comprising computer-executable instructions that, when executed, cause a first terminal device to perform:
sending, at a first protocol layer entity of the first terminal device, communication type information and a target side identifier to a second protocol layer entity of the first terminal device, wherein the communication type information identifies a unicast communication, and the target side identifier comprises an identifier of a second terminal device; and
establishing, at the second protocol layer entity of the first terminal device, at least one radio bearer for unicast communication, wherein the at least one radio bearer correspond to the target side identifier.

14. The non-transitory memory storage medium according to claim 13,
wherein configuration information of the at least one radio bearer is prestored in the first terminal device.

15. The non-transitory memory storage medium according to claim 13, wherein the instructions, when executed, cause the first terminal device further to perform:
sending, at the second protocol layer entity of the first terminal device, a first message to a second protocol layer entity of the second terminal device, wherein the first terminal device and the second terminal device are performing or are to perform the unicast communication, and the first message comprises configuration information of the at least one radio bearer; and
receiving, at the second protocol layer entity of the first terminal device, a second message in response to the first message from the second terminal device.

16. The non-transitory memory storage medium according to claim 15, wherein the instructions, when executed, cause the first terminal device further to perform:
when the second protocol layer entity of the first terminal device does not receive the second message in a duration greater than or equal to a specified duration, resending, at the second protocol layer entity of the first terminal device, the first message to the second protocol layer entity of the second terminal device.

17. The non-transitory memory storage medium according to claim 15, wherein the instructions, when executed, cause the first terminal device further to perform:
determining, at the second protocol layer entity of the first terminal device, a security mode configuration that is to be used by the first terminal device to perform confidentiality protection and integrity protection on the first message; and
wherein sending, at the second protocol layer entity of the first terminal device, the first message to the second protocol layer entity of the second terminal device comprises: sending, at the second protocol layer entity of the first terminal device, the first message and the security mode configuration to a packet data convergence protocol (PDCP) layer entity of the first terminal device, wherein after performing the confidentiality protection and the integrity protection on the first message based on the security mode configuration, the PDCP layer entity of the first terminal device sends the first message to the second protocol layer entity of the second terminal device.

18. The non-transitory memory storage medium according to claim 13, wherein the instructions, when executed, cause the first terminal device further to perform:
broadcasting, at the first protocol layer entity of the first terminal device, an establishment request, wherein the establishment request requests to establish the unicast communication; and
receiving, at the first protocol layer entity of the first terminal device, an establishment response, wherein the establishment response indicates to establish the unicast communication with the first terminal device.

* * * * *